United States Patent
Moon et al.

(10) Patent No.: US 9,641,234 B2
(45) Date of Patent: May 2, 2017

(54) PREAMBLE AND PAYLOAD FOR HIGH EFFICIENCY (HE) TRANSMISSION

(71) Applicant: NEWRACOM, INC., Irvine, CA (US)

(72) Inventors: Sungho Moon, Irvine, CA (US); Daewon Lee, Irvine, CA (US); Young Hoon Kwon, Laguna Niguel, CA (US); Yujin Noh, Irvine, CA (US)

(73) Assignee: Newracom, Inc., Irvine, CA (US)

( * ) Notice: Subject to any disclaimer, the term of this patent is extended or adjusted under 35 U.S.C. 154(b) by 0 days.

(21) Appl. No.: 15/136,830

(22) Filed: Apr. 22, 2016

(65) Prior Publication Data

US 2016/0315681 A1  Oct. 27, 2016

Related U.S. Application Data

(60) Provisional application No. 62/152,509, filed on Apr. 24, 2015.

(51) Int. Cl.
*H04L 12/28* (2006.01)
*H04B 7/06* (2006.01)
(Continued)

(52) U.S. Cl.
CPC ......... *H04B 7/0621* (2013.01); *H04B 7/0452* (2013.01); *H04W 74/0816* (2013.01); *H04W 84/12* (2013.01)

(58) Field of Classification Search
USPC ................... 370/252, 389, 278, 329
See application file for complete search history.

(56) References Cited

U.S. PATENT DOCUMENTS

2011/0188424 A1  8/2011  Ramamurthy et al.
2012/0044925 A1  2/2012  Lee et al.
(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — John Pezzlo
(74) *Attorney, Agent, or Firm* — McDermott Will & Emery LLP

(57) ABSTRACT

In wireless communications, an access point may send a trigger frame to multiple stations. The trigger frame's payload may include a first content and a second content, where the first content is associated with a legacy signal field of an uplink frame, and the second content is associated with a non-legacy signal field of the uplink frame. In response to the trigger frame, one or more stations may generate the uplink frame(s) based on the trigger frame and transmit the uplink frame(s) to the access point. The uplink frame(s) may include a legacy signal field and a non-legacy signal field. The legacy field may include a length of the uplink frame(s) that is based on the first content. The non-legacy signal field may include a remaining transmission opportunity (TXOP) duration that is generated based on the second content. Other methods, apparatus, and computer-readable media are also disclosed.

16 Claims, 19 Drawing Sheets

(51) Int. Cl.
    *H04B 7/0452* (2017.01)
    *H04W 74/08* (2009.01)
    *H04J 1/16* (2006.01)
    *H04W 84/12* (2009.01)

(56) References Cited

U.S. PATENT DOCUMENTS

| | | | |
|---|---|---|---|
| 2012/0327915 A1 | 12/2012 | Kang et al. | |
| 2015/0043409 A1 | 2/2015 | Choi et al. | |
| 2015/0055546 A1 | 2/2015 | Jafarian et al. | |
| 2015/0063318 A1 | 3/2015 | Merlin et al. | |
| 2015/0319782 A1* | 11/2015 | Chu | H04W 74/08 370/336 |
| 2016/0087766 A1* | 3/2016 | Sun | H04L 5/0007 370/329 |
| 2016/0119933 A1* | 4/2016 | Merlin | H04L 5/0048 370/312 |
| 2016/0315675 A1* | 10/2016 | Seok | H04B 7/0452 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," Mar. 29, 2012.

LAN/MAN Standards Committee of the IEEE Computer Society, "IEEE P502.11ah™/D6.0 Draft Standard for information technolooy—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Feb. 2016.

International Search Report and Written Opinion dated Aug. 4, 2016, which issued in International Application No. PCT/US16/29031.

* cited by examiner

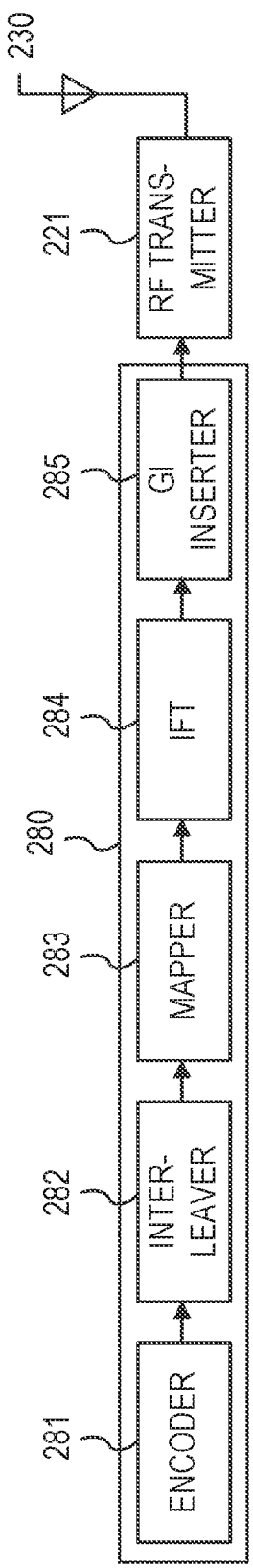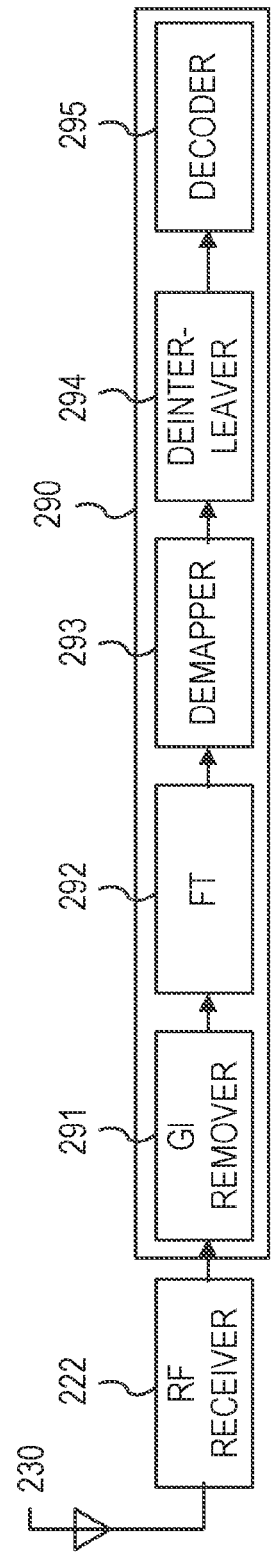
FIG. 3A
FIG. 3B

SIG field format for 1 MHz NDP CMAC frame

SIG field format for >= 2 MHz NDP CMAC frame

FIG. 15

| NDP CMAC Frame Type | CTS/CF-End Indicator | Address Indicator | RA/Partial BSSID | Duration | Early Sector Indicator | Bandwidth Indication | Reserved |
|---|---|---|---|---|---|---|---|
| B0   B2 | B3 | B4 | B5   B13 | B14   B28 | B29 | B30   B32 | B33   B36 |
| 3 | 1 | 1 | 9 | 15 | 1 | 3 | 4 |

Bits:

NDP CMAC frame body field of the NDP_2M CTS frame

FIG. 16

| NDP CMAC Frame Type | CTS/CF-End Indicator | Partial BSSID (TA) | Duration | Reserved |
|---|---|---|---|---|
| B0   B2 | B3 | B4   B12 | B13   B27 | B28   B36 |
| 3 | 1 | 9 | 15 | 9 |

Bits:

NDP CMAC frame body field of the NDP_2M CF-End frame

FIG. 17

| NDP CMAC Frame Type | RA | TA | Preferred MCS | UDI |
|---|---|---|---|---|
| B0  B2 | B3  B11 | B12  B20 | B21  B24 | B25  B36 |
| 3 | 9 | 9 | 4 | 12 |

Bits:

NDP CMAC frame body field of the NDP_2M PS-Poll frame

FIG. 18

| NDP CMAC Frame Type | Ack ID | More Data | Idle Indication | Duration | Relayed Frame | Reserved |
|---|---|---|---|---|---|---|
| B0  B2 | B3  B18 | B19 | B20 | B21  B34 | B35 | B36 |
| 3 | 16 | 1 | 1 | 14 | 1 | 1 |

Bits:

NDP CMAC frame body field of the NDP_2M Ack frame

PREAMBLE AND PAYLOAD FOR HIGH EFFICIENCY (HE) TRANSMISSION

CROSS-REFERENCE TO RELATED APPLICATIONS

This application claims the benefit of priority from U.S. Provisional Application No. 62/152,509, entitled "PREAMBLE FOR UL MU TRANSMISSION IN HE WLAN," filed Apr. 24, 2015, which is incorporated herein by reference in its entirety.

TECHNICAL FIELD

The present description relates in general to wireless communication systems and methods, and more particularly to, for example, without limitation, preamble and payload for high efficiency (HE) transmission.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIG. 3A illustrates a schematic block diagram of an example of a transmitting signal processor in a wireless communication device.

FIG. 3B illustrates a schematic block diagram of an example of a receiving signal processor in a wireless communication device.

FIG. 15 illustrates an example of an NDP clear to send (CTS) frame.

FIG. 16 illustrates an example of an NDP contention-free end (CF-End) frame.

FIG. 17 illustrates an example of an NDP power save-poll (PS-Poll) frame.

FIG. 18 illustrates an example of an NDP acknowledgement (Ack) frame.

Figure 1:
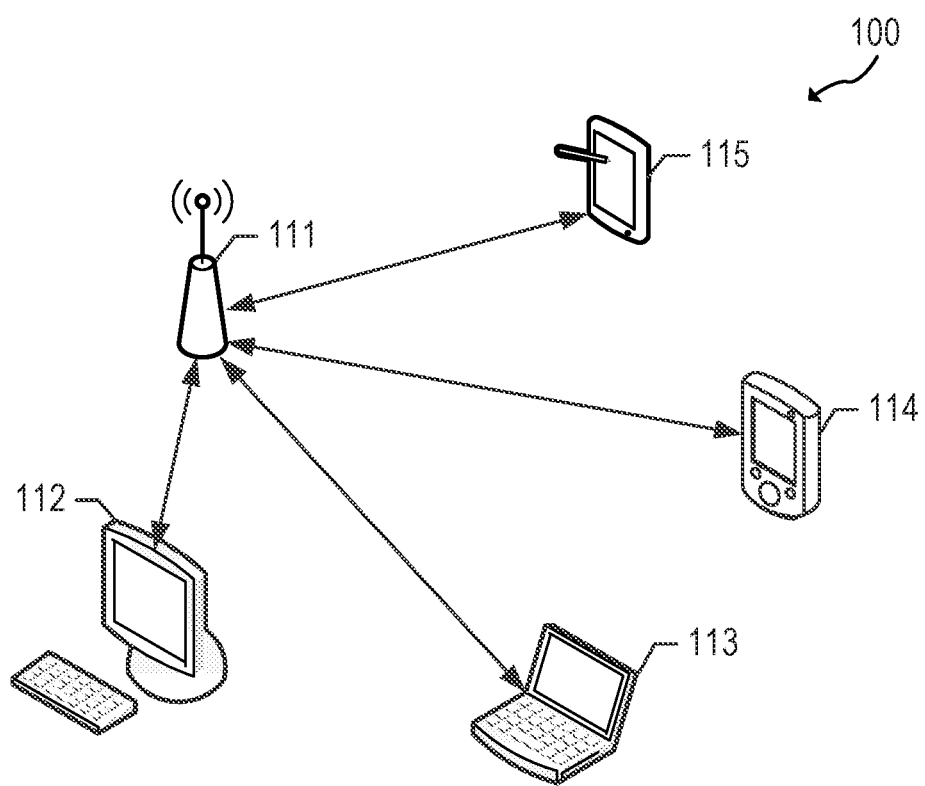
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Multi-user (MU) transmission in next-generation WLAN systems include techniques such as downlink/uplink (DL/UL) MU multiple-input/multiple-output (MIMO) and DL/UL orthogonal frequency division multiple access (OFDMA). In the Institute of Electrical and Electronics Engineers (IEEE) 802.11, Task Group ax, (IEEE 802.11ax), OFDMA technology may be utilized to provide a multiple access scheme to improve network efficiency. OFDMA is a technology that allows multiple stations (STAs) to transmit frames simultaneously using non-overlapping frequency-time resources. IEEE 802.11ax may be referred to as High Efficiency LAN (HE LAN) or High Efficiency WLAN (HE WLAN).

A trigger frame may be a frame sent by an AP that seeks data, control, or management frame response(s) from stations that participate in a subsequent UL MU frame. The trigger frame may be utilized to initiate the MU simultaneous transmission in OFDMA. In an aspect, a trigger frame may include, for example, some or all of the following features: (a) a list of stations (STAs) that an access point (AP) seeks a response from; (b) resource allocation information for each STA (e.g., a sub-band assigned to each STA); and/or (c) attributes of the expected UL MU frame, such as the duration, bandwidth, etc., among other features. In other words, the trigger frame may be used to allocate resource for UL MU transmission and to solicit an UL MU transmission from the participating stations in response to the trigger frame. The term "resource" may refer to, for example, bandwidth, time/duration that the STAs expect to occupy a transmission medium, and/or possibly a number of spatial streams that the STAs may use.

In one or more implementations. in IEEE 802.11ax, a UL MU physical layer convergence procedure (PLCP) protocol data unit (PPDU) (e.g., MU-MIMO or OFDMA) is sent as a response (e.g., an immediate response) to a trigger frame sent by an AP. The UL MU PPDUs may be, for example, referred to as trigger-based UL MU PPDUs, trigger-based UL PPDUs, HE trigger-based UL MU PPDU response, or a variant/combination thereof (e.g., HE trigger-based UL MU PPDUs). In some aspects, since UL MU transmission may be triggered by an AP, a signal-A (SIG-A) field in a UL MU PPDU can have a format different from downlink PPDUs or uplink single-user (SU) PPDUs. One or more aspects of the present disclosure provide a new design for a SIG-A field in UL MU PPDUs. The SIG-A field may include modifications and/or additions to the SIG-A field of the very high throughput (VHT) WLAN utilized in the IEEE 802.11ac standard, which is incorporated herein in its entirety.

In one or more implementations, contents in a preamble (e.g., legacy signal (L-SIG) field and SIG-A field) in UL MU PPDU may follow one or more of the following traits:

UL MU PPDUs can have a different SIG-A from non-UL MU PPDUs
  An indication bit(s) should be located in the same bit positions with that (those) of non-UL MU SIG-A
  Duration and absolute occupied frequency information can be included in UL MU SIG-A
    Duration for time-protection
    Bandwidth and absolute channel number of 20 MHz for frequency-protection
  Null data packet (NDP) clear to send (CTS) frame format without 4 bit reservation can be used for SIG-A field in UL MU PPDU.

In an aspect, a non-UL MU PPDU may include, for example, one or more of the following: a UL SU PPDU, a DL SU PPDU, and a DL MU PPDU. In an aspect, UL MU SIG-A may refer to a SIG-A field of a UL MU PPDU. In an aspect, non-UL MU SIG-A may refer to a SIG-A field of a non-UL MU PPDU. In an aspect, the indication bit(s) may be utilized to differentiate between UL MU PPDUs and non-UL MU PPDUs. For instance, the indication bit(s) may be utilized to differentiate between UL MU PPDU and SU PPDU.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
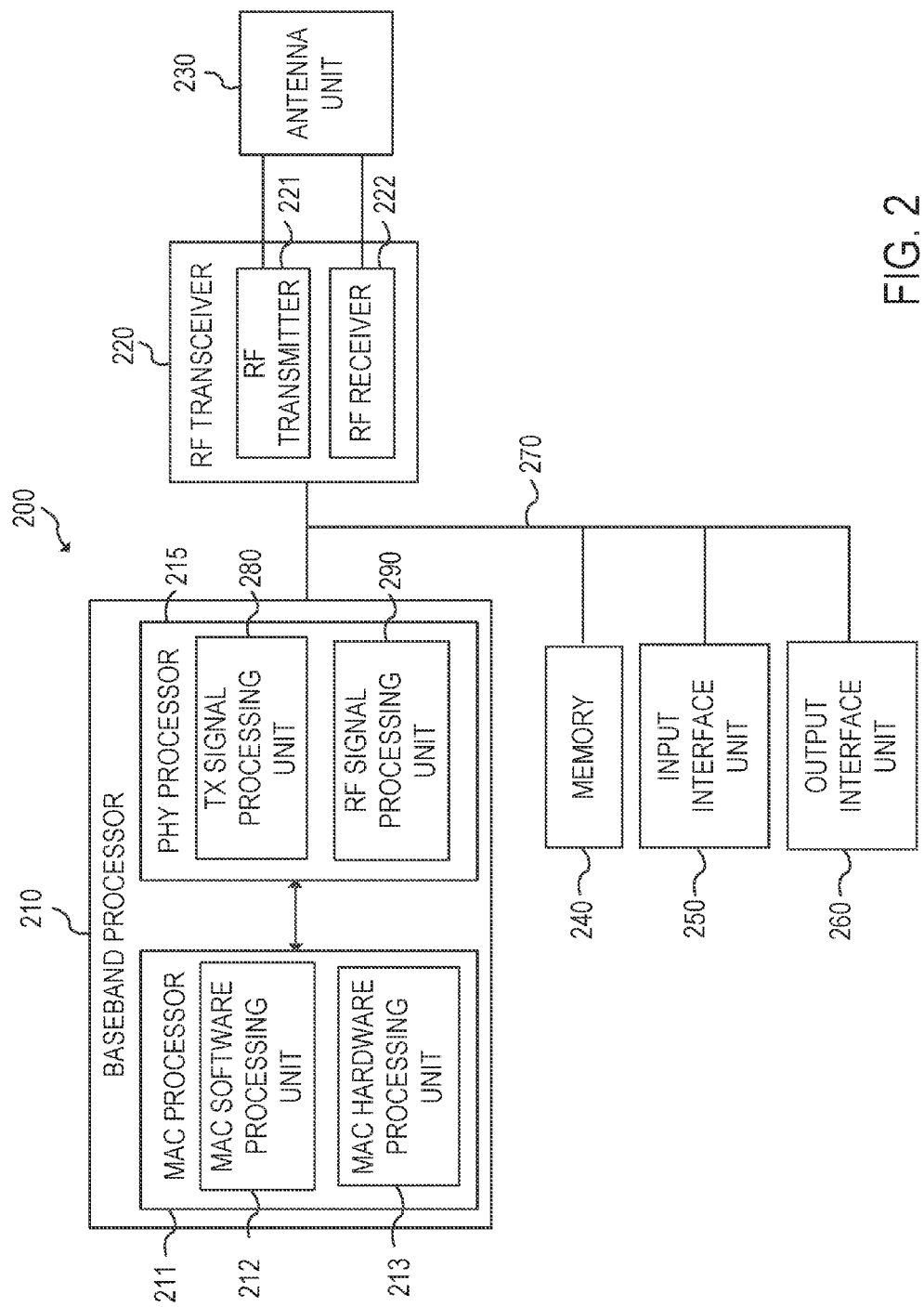
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
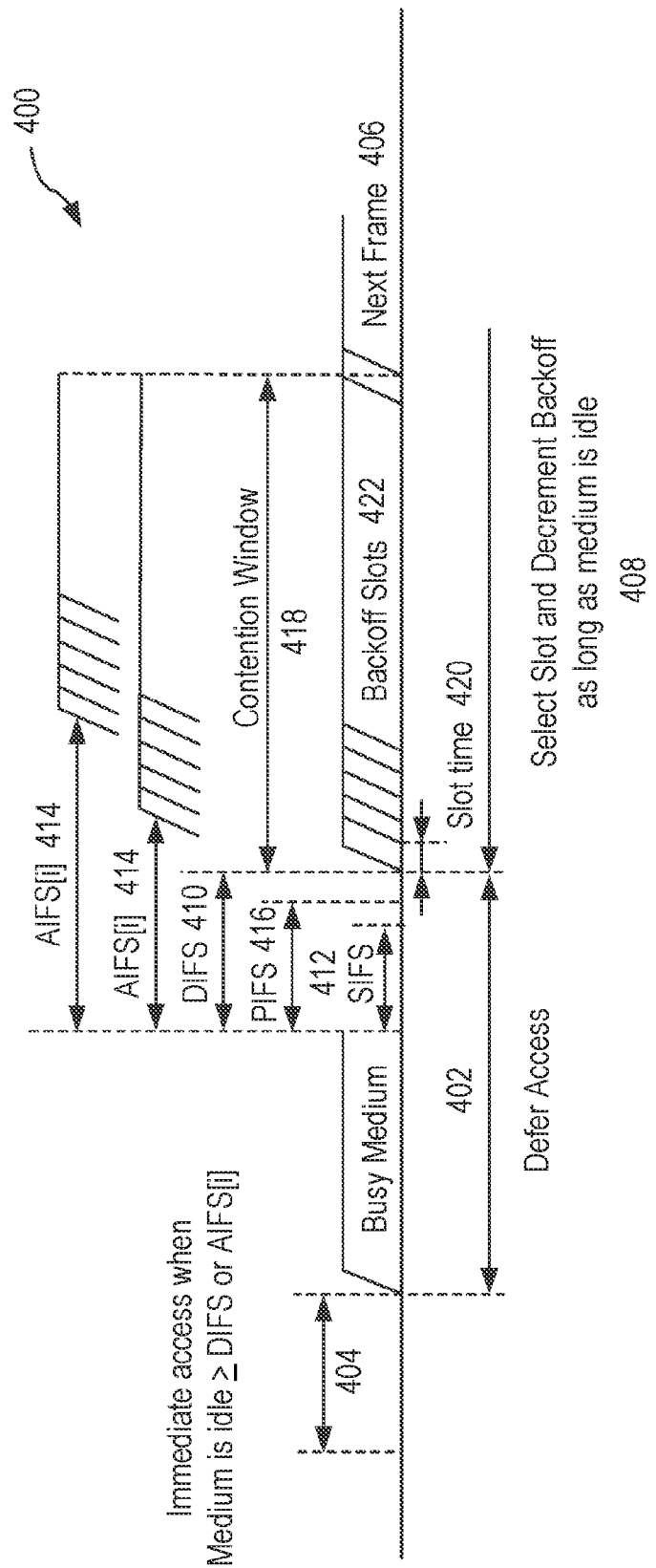
FIG. 4 illustrates an example of a timing diagram of interframe space (IFS) relationships.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
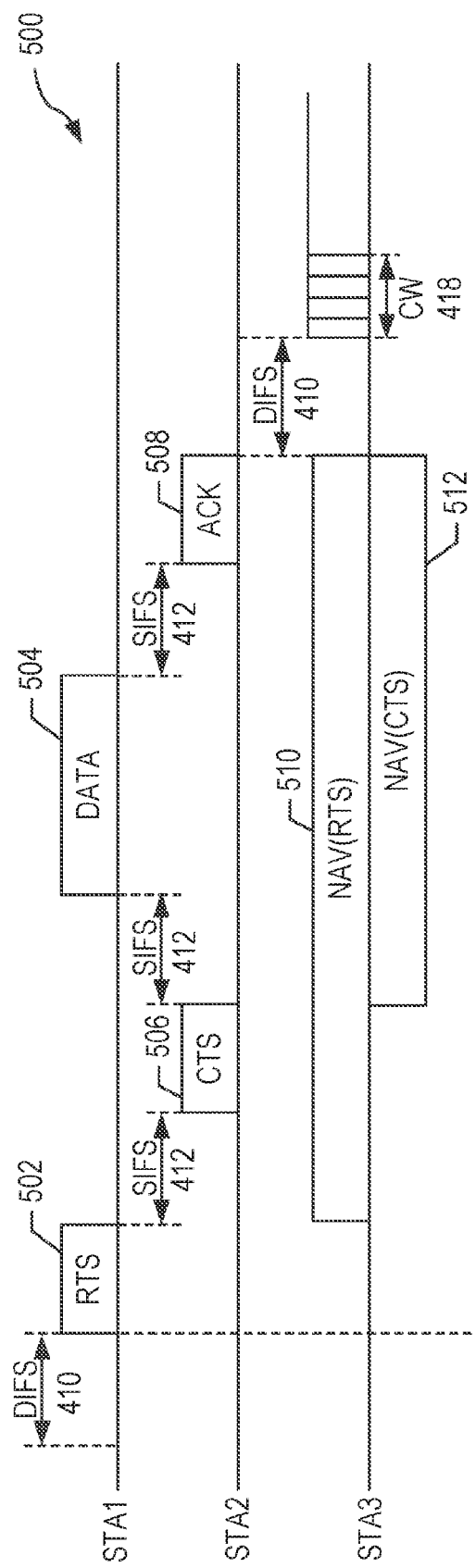
FIG. 5 illustrates an example of a timing diagram of a carrier sense multiple access/collision avoidance (CSMA/CA) based frame transmission procedure for avoiding collision between frames in a channel.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel. In one or more implementations, the STA1 determines the channel occupation by using a network allocation vector (NAV) timer.

When determining that the channel is not used by other devices during the DIFS 410 (e.g., the channel is idle), the STA1 may transmit an RTS frame 502 to the STA2 after performing backoff. Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgment of receiving the data frame 504.

When the NAV timer expires, the STA3 may determine whether the channel is busy by the carrier sensing. Upon determining that the channel is not used by the other WLAN devices (e.g., STA1, STA2) during the DIFS 410 after the NAV timer has expired, the STA3 may attempt the channel access after a contention window 418 has elapsed. In this example, the contention window 418 may be based on a random backoff.

Figure 6:
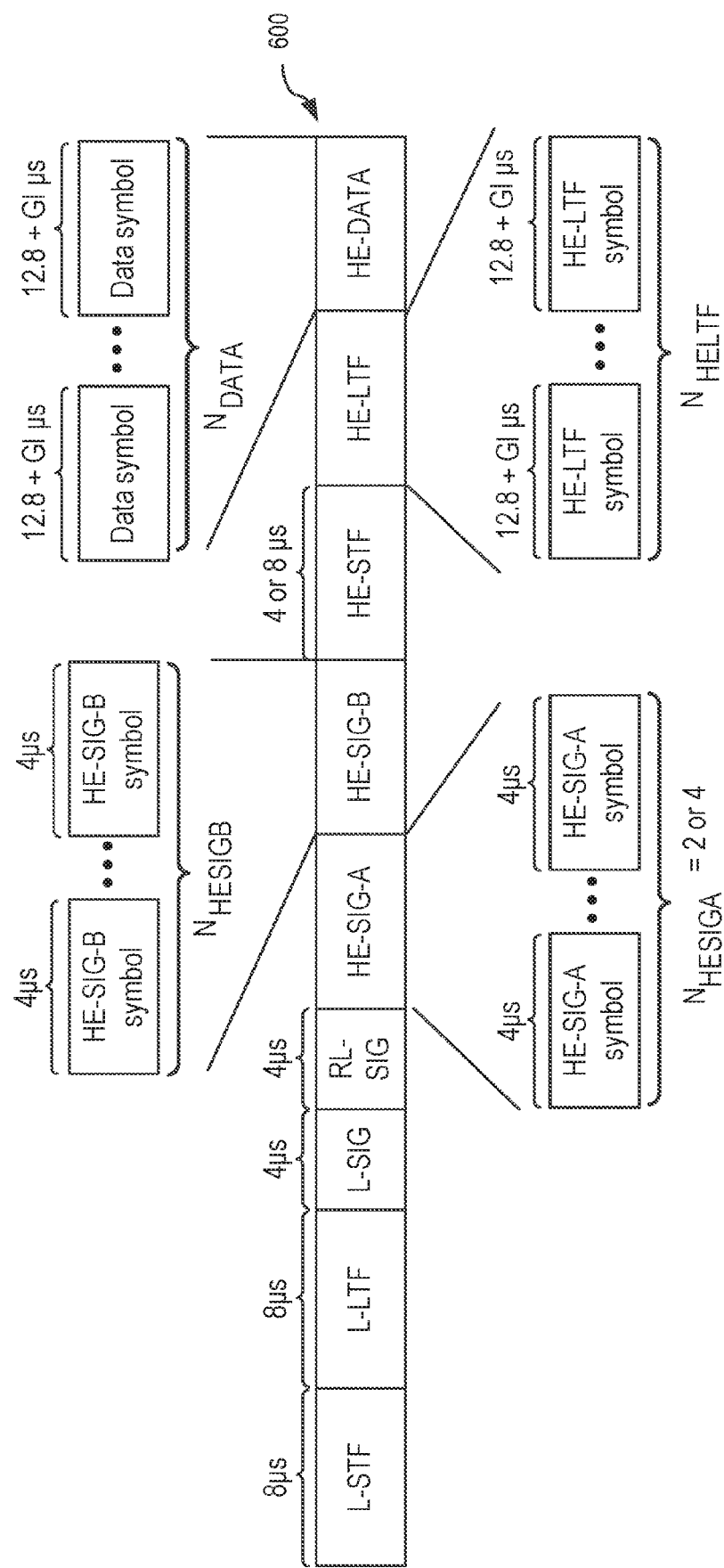
FIG. 6 illustrates an example of a high efficiency (HE) frame.

FIG. 6 illustrates an example of a high efficiency (HE) frame 600. The HE frame 600 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

Referring to FIG. 6, the HE frame 600 contains a header and a data field. The header includes a legacy header comprised of a legacy short training field (L-STF), a legacy long training field (L-LTF), and a legacy signal (L-SIG) field. These legacy fields contain symbols based on an early design of an IEEE 802.11 specification. The L-STF, L-LTF, and L-SIG fields may be 8 μs, 8 μs, and 4 μs, respectively. Presence of these symbols would make any new design compatible with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz (e.g., 40 MHz, 80 MHz, 160 MHz). Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. Thus, in one aspect, the L-STF field is not affected by the channel dispersion. The L-LTF field may be utilized for channel estimation, fine frequency-offset correction, and symbol timing. The L-SIG field includes one orthogonal frequency division multiplexing (OFDM) symbol. Thus, in one aspect, the term L-SIG field may be used interchangeably with L-SIG symbol. In one or more aspects, the L-SIG field may contain information indicative of a data rate and a length (e.g., in bytes) associated with the HE frame 600, which may be utilized by a receiver of the HE frame 600 to calculate a time duration of a transmission of the HE frame 600.

The header may also include an HE header comprised of an HE-SIG-A field and an HE-SIG-B field. The HE-SIG-A field may sometimes be referred to simply as a SIG-A field. These fields contain symbols that carry control information that may be vital regarding each PLCP service data unit (PSDU) and regarding the radio frequency (RF), PHY, and MAC properties of a PPDU. Several sub-fields may be located either in the HE-SIG-A and/or HE-SIG-B fields. In one aspect, the HE-SIG-A field can be carried/modulated using an FFT size of 64 on a 20 MHz basis. The HE-SIG-B field can be carried/modulated using an FFT size of e.g., 64 or 256 on a 20 MHz basis depending on implementation. The HE-SIG-A and HE-SIG-B fields may occupy the entire channel bandwidth of the frame. In some aspects, the size of the HE-SIG-A field and/or the HE-SIG-B field is variable. In other words, the number of symbols contained in the HE-SIG-A field and/or HE-SIG-B field can vary from frame to frame. An HE-SIG-B field is not always present in all frames. In some cases, single user (SU) packets and UL trigger-based packets do not contain the HE-SIG-B field. To facilitate decoding of the HE frame 600 by a receiver, the size of (e.g., number of symbols contained in) the HE-SIG-B field may be indicated in the HE-SIG-A field. In some aspects, the HE header also includes a repeated L-SIG (RL-SIG) field, whose content is the same as the L-SIG field.

For a 20 MHz channel, an FFT size of 64 is associated with a discrete Fourier transform (DFT) period of 3.2 µs and a subcarrier spacing of 312.5 kHz. For a 20 MHz channel, an FFT size of 256 is associated with a DFT period of 12.8 µs and a subcarrier spacing of 78.125 kHz. The DFT period may also be referred to as an inverse DFT period (IDFT) or an IDFT/DFT period. The DFT period may be denoted as $T_{DFT}$. The subcarrier spacing may be referred to as a subcarrier frequency spacing and may be denoted as $\Delta_F$. The subcarrier spacing may be obtained by dividing the channel bandwidth by the FFT size. The subcarrier spacing is the reciprocal of the DFT period.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LTF field may occupy the entire channel bandwidth of the frame. In one aspect, an HE-LTF sequence may be utilized by a receiver to estimate MIMO channel between the transmitter and the receiver. Channel estimation may be utilized to decode data transmitted and compensate for channel properties (e.g., effects, distortions). For example, when a preamble is transmitted through a wireless channel, various distortions may occur, and a training sequence in the HE-LTF field is useful to reverse the distortion. This may be referred to as equalization. To accomplish this, the amount of channel distortion is measured. This may be referred to as channel estimation. In one aspect, channel estimation is performed using an HE-LTF sequence, and the channel estimation may be applied to other fields that follow the HE-LTF sequence.

The HE-STF symbols may have a fixed pattern and a fixed duration. For example, the HE-STF symbols may have a predetermined repeating pattern. In one aspect, the HE-STF symbols do not require FFT processing. The HE frame 600 may include the data field, represented as HE-DATA, that contains data symbols. The data field may also be referred to as a payload field, data, payload, PSDU, or Media Access Control (MAC) Protocol Data Units (MPDU) (e.g., MAC frame).

In one or more aspects, additional one or more HE-LTF fields may be included in the header. For example, an additional HE-LTF field may be located after a first HE-LTF field. The HE-LTF fields may be, for example, modulated/ carried with FFT size of 64 on a 20 MHz channel and may be included as part of the first part of the HE frame 600. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

Figure 7:
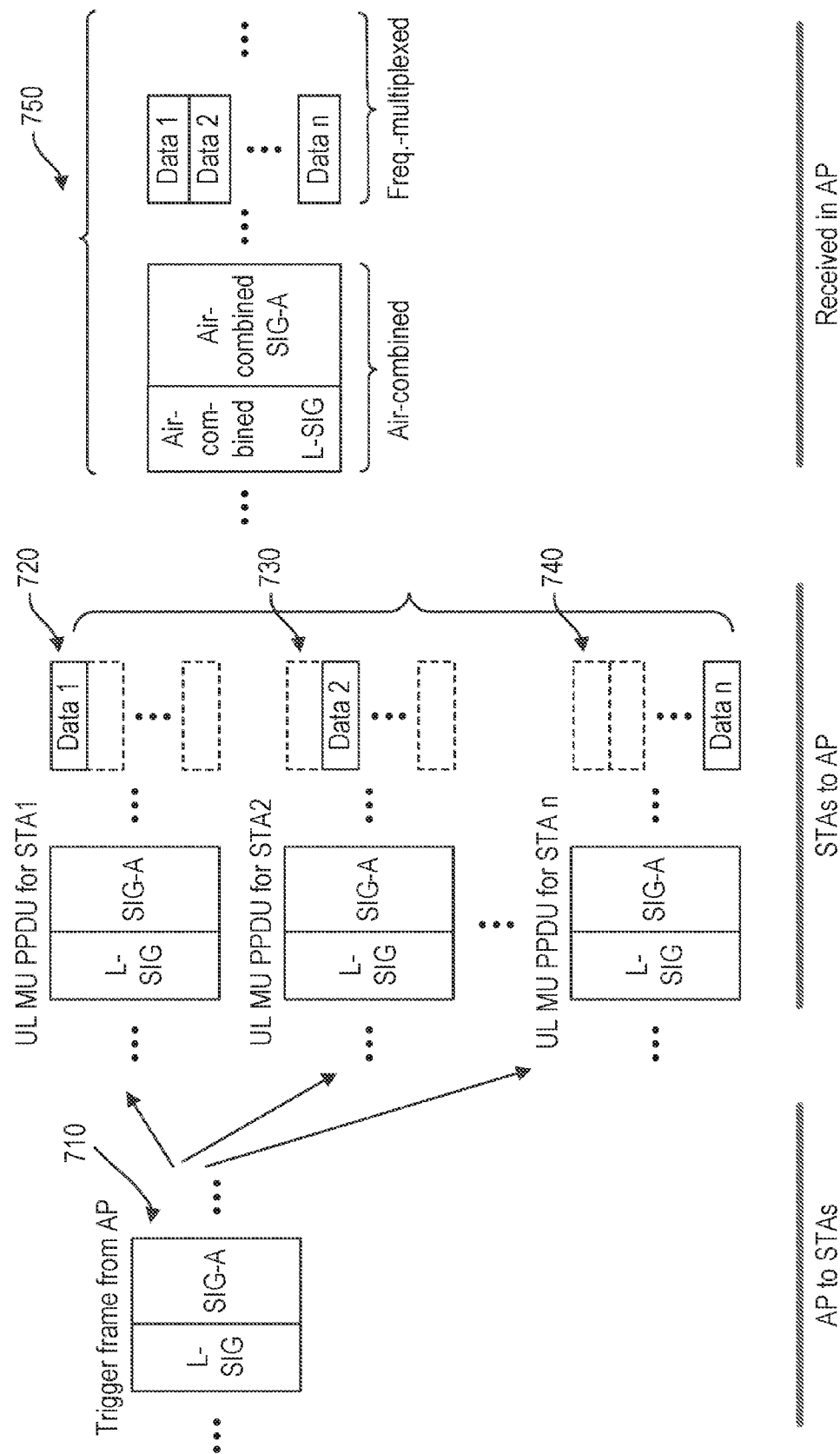
FIGS. 7, 8, and 9 illustrate schematic diagrams of examples of an exchange of frames among wireless communication devices for communication in a wireless network for multi-user (MU) transmission.

FIG. 7 illustrates a schematic diagram of an example of an exchange of frames among wireless communication devices for MU transmission. An MU transmission may be, for example, MU-MIMO or OFDMA. A UL MU PPDU may be a UL MU-MIMO PPDU or a UL OFDMA PPDU. The horizontal dimension in FIG. 7 represents the time dimension. The wireless communication devices include an AP, a participating STA1, a participating STA2, and a participating STA n. Although FIG. 7 illustrates an exchange of frames between an AP and three stations participating in an MU transmission, the exchange of frames may be between the AP and fewer than or greater than three stations, including the exchange of frames between the AP and one participating station (e.g., a non-OFDMA case).

In FIG. 7, the AP sends a trigger frame 710 to a group of stations (e.g., STA1, STA2, and STA n). The trigger frame 710 may occupy the entire channel bandwidth over which DL MU (e.g., OFDMA) transmission occurs. By way of non-limiting example, the entire channel bandwidth over which DL transmission occurs may be 20 MHz, 40 MHz, 80 MHz, or 160 MHz. The trigger frame 710 may provide, for example, a transmission opportunity (TXOP) to the participating stations and may indicate resource allocation information for the participating stations pertaining to MU transmission. The trigger frame 710 may indicate the TXOP duration. The TXOP duration may be an interval/duration of time during which the participating stations have the right to initiate frame exchange sequences onto the wireless medium. In an aspect, within the TXOP duration, the trigger frame 710, one or more uplink frames (e.g., 720, 730, 740, 750), and/or one or more downlink frames (not shown) may be sent between the AP and the participating stations. In an aspect, the TXOP duration may include the transmission time of the trigger frame 710.

The resource allocation information may include a sub-band (or a frequency subchannel) assigned to each respective one of the participating stations. For instance, when there are two stations, and the uplink channel bandwidth is, for example, 80 MHz, then the AP may assign a sub-band of the uplink channel bandwidth (e.g., a portion of 80 MHz) to each respective station so that each station has its assigned sub-band. In some aspects, the resource allocation information may also include scheduling information regarding when a respective one of the participating stations may transmit using its assigned sub-band, and/or may include the number of spatial streams that the stations may use.

In some aspects, the trigger frame 710 may include per user information (Per User Info) fields, where each station is associated with one of the Per User Info fields. For example, STA1 may be associated with the Per User Info 1 field, STA2 may be associated with the Per User Info 2 field, and so forth. A User Identifier field and a Resource Unit (RU) Allocation field of each Per User Info field may indicate an association identifier (AID) of the station associated with the Per User Info field and the station's allocated RU for use in transmitting the MPDU(s) in the HE trigger-based PPDU. A Spatial Steam (SS) Allocation field of each Per User Info field may indicate the spatial streams of the HE trigger-based PPDU response to the station identified by the User Identifier field.

When the participating stations receive the trigger frame 710 sent by the AP, the participating stations may decode the trigger frame 710 and identify the frequency sub-bands allocated to the participating stations. The participating stations may transmit uplink frames as part of UL OFDMA transmission to the AP. In this regard, each of STA1, STA2, and STA n may transmit an uplink frame 720, 730, and 740, respectively, that includes a header and a payload. The uplink frames 720, 730, and 740 may be referred to as UL MU PPDUs. By way of non-limiting example, the entire channel bandwidth over which UL OFDMA transmission occurs may be 20 MHz, 40 MHz, 80 MHz, or 160 MHz.

In some aspects, the header of the uplink frames 720, 730, and 740 may be identical to each other. The header (or at least a portion of the header) of the uplink frames 720, 730, and 740 may occupy the entire channel bandwidth supported by the UL OFDMA transmission (or the UL MU transmission). The header may include a legacy header. In an aspect, the header may include a legacy header and some or all fields of a non-legacy header (e.g., an HE header). In another aspect, the header (or at least a portion of the header) of the uplink frames 720, 730, and 740 may occupy only one or more 20 MHz channel bandwidths within which the payload (e.g., HE-DATA field) is transmitted. In one or more aspects, the header of the frame may correspond to the preamble of PPDU according to the IEEE 802.11 standard. For instance, the header/preamble of the uplink frames 720, 730, and 740 may include a legacy header and a non-legacy header, such as described above, for example, with respect to the HE frame 600 of FIG. 6.

The payload of the uplink frames 720, 730, and 740 may be a PSDU (or an HE-DATA field of the frame 600) that occupies a frequency sub-band. In FIG. 7, the payload (e.g., HE-DATA field) of the participating STA1, STA2, and STA n are represented by Data 1, Data 2, and Data n, respectively, and may occupy a respective frequency sub-band assigned to each participating station.

After the stations transmit their respective uplink frame 720, 730, and 740, the uplink frames 720, 730, and 740 may be combined (or aggregated) to form a single combined frame 750, which is received by the AP. A single combined frame may be referred to as an air-combined frame, an aggregated frame, a combined UL frame, a final UL frame, an MU frame, a UL MU frame, a UL OFDMA frame, or a variant/combination thereof (e.g., an air-combined UL frame). The payload associated with each participating station is frequency multiplexed in the single combined frame 750. In an aspect, the HE trigger-based PPDU response may include and/or may refer to the uplink frames 720, 730, and 740, and/or the single combined frame 750.

It is noted that FIG. 7 depicts a portion of the trigger frame 710, uplink frames 720, 730, and 740, and single combined frame 750. For example, in FIG. 7, for the uplink frame 720, the L-SIG field of the legacy header, the SIG-A (HE-SIG-A) field of the non-legacy header, and the payload are shown. The ellipses before the L-SIG field and after the SIG-A (HE-SIG-A) field may indicate one or more additional fields prior to the L-SIG field and after the SIG-A (HE-SIG-A) field, respectively. The ellipses between the uplink frames 730 and 740 may indicate one or more additional uplink frames or no uplink frames between the uplink frames 730 and 740. In an aspect, the L-SIG field shown in the frames 710, 720, 730, 740, and 750 may be the RL-SIG (Repeated L-SIG) field.

As shown in FIG. 7, in some aspects, in an UL MU PPDU (e.g., 720, 730, 740), information in the L-SIG field and SIG-A field may be air-combined. Thus, in some aspects, the AP shall send a trigger frame (e.g., 710) to the participating stations, and the participating stations, upon receipt of the trigger frame, may form the UL MU preamble (e.g., UL MU header) of the UL MU PPDU based on the contents of the trigger frame. In other words, the contents of the trigger frame may be used to form/derive the UL MU preamble. For example, the participating stations may derive the UL MU preamble based on the contents of the trigger frame and/or copy the contents of the trigger frame into fields (e.g., L-SIG field, SIG-A field) of the UL MU preamble.

In some cases, therefore, the AP may know all the information potentially contained in the L-SIG and SIG-A fields in the UL MU PPDUs from the participating stations. In such cases, since the AP already knows the content of the L-SIG field and the HE-SIG-A field of the UL MU PPDUs prior to receiving the UL MU PPDUs, it may be redundant to include the information in the valuable preamble portion of the UL MU PPDUs. As the AP already knows the content of the L-SIG field and the HE-SIG-A field of the UL MU PPDUs, the AP's trigger frame may contain the content associated with a L-SIG field of a UL MU PPDU (L-SIG information) and the content associated with an HE-SIG-A field of a UL MU PPDU (SIG-A information), and a STA may generate its uplink frame having the L-SIG field and the HE-SIG-A field, where the uplink frame's L-SIG field is provided based on the L-SIG information contained in the trigger frame, and the uplink frame's HE-SIG-A field is generated based on the SIG-A information contained in the trigger frame.

In one or more implementations, the preamble (e.g., L-SIG and SIG-A) structure in the UL MU PPDUs may be designed with the following traits:

L-SIG field and SIG-A field are air-combined, and thus all contents from the participating UL MU stations should be the same;

L-SIG field should be understood by legacy stations (e.g., IEEE 802.11 a, b, g, n, and ac stations);

SIG-A is more valuable if it can be understood by third party stations.

Figure 8:
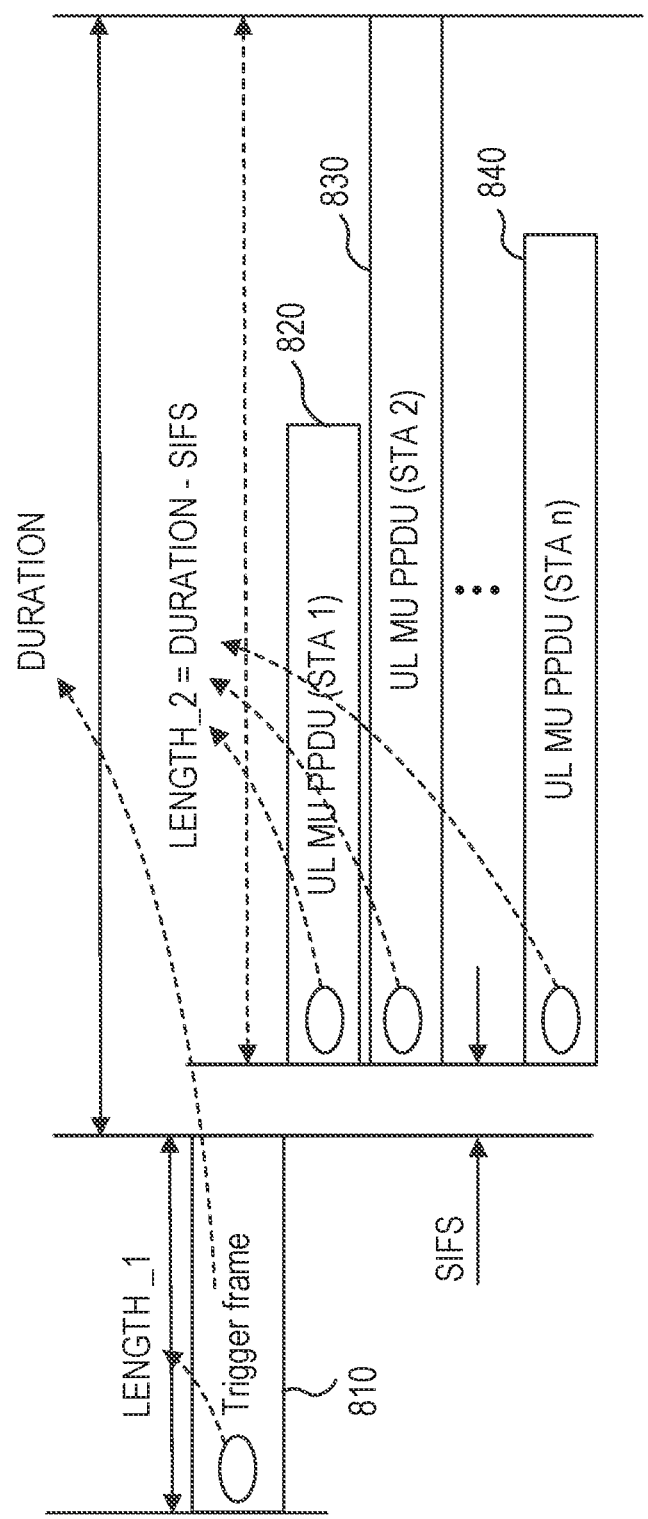

FIG. 8 illustrates a schematic diagram of an example of an exchange of frames among wireless communication devices for MU transmission. The horizontal dimension in FIG. 8 represents the time dimension. An AP may send a trigger frame 810 to participating stations STA1, STA2, and STA n, and the participating stations STA1, STA2, and STA n may transmit uplink frames 820, 830, and 840, respectively, to the AP in response to the trigger frame 810. In an aspect, the uplink frames 820, 830, and 840 are combined to form a single combined UL frame, which is received by the AP. In an aspect, the frames 810, 820, 830, 840, and the combined UL frame may be, may include, or may be a part of, the frames 710, 720, 730, 740, 750, respectively. It is noted that the ellipses between the uplink frames 830 and 840 may indicate one or more additional uplink frames or no uplink frames between the uplink frames 830 and 840.

In one or more aspects, in the case of the L-SIG field in the UL MU PPDUs (e.g., the uplink frames 820, 830, and 840), the legacy L-SIG format may be reused. The legacy L-SIG format is utilized in other IEEE 802.11 specifications, including, for example, the IEEE 802.11 a, b, g, n, and ac specifications. Reuse of the legacy L-SIG field in the UL MU PPDU may facilitate compatibility with the legacy devices and allow the legacy stations (e.g. non-HE stations) to understand the L-SIG field of the HE trigger-based based UL MU PPDUs. In the legacy L-SIG format, the L-SIG field may include a RATE field and a LENGTH field. In an aspect, an HE station may set (e.g., pre-define) the RATE subfield of the L-SIG field to 6 Mbps and derive a value of the LENGTH field of the L-SIG field that indicates the time duration of the UL MU PPDU. The LENGTH field may include a spoofed length (e.g. in bytes) such that when any receiver of the UL MU PPDU (e.g., the AP) calculates the length of the UL MU PPDU, the computed length matches the time duration required for the UL MU PPDU.

With reference to FIG. 8, the trigger frame 810 may include a value LENGTH_1 in its L-SIG field that is indicative of a transmission time for transmitting the trigger frame 810. In an aspect, the value LENGTH_1 may be contained in the LENGTH field of the L-SIG field of the trigger frame 810. The trigger frame 810 may also include a DURATION. As shown in FIG. 8, the DURATION may correspond to a time duration from the end of the trigger frame 810 until the end of the UL MU PPDU. In an aspect, the DURATION indicated by the trigger frame 810 may be based on a longest UL MU PPDU to be transmitted by a participating station in response to the trigger frame 810. In other words, the DURATION may be based on a longest UL MU PPDU of the UL MU PPDUs to be received (e.g., received simultaneously) by the AP. In the case that a TXOP duration according to the IEEE 802.11 standard ends at the same time as the end of the UL MU PPDU, the DURATION may be the same as the TXOP duration.

Each of the uplink frames 820, 830, and 840 may include a value LENGTH_2 in its L-SIG field (e.g., LENGTH in the L-SIG field) that is indicative of a transmission time for transmitting the uplink frames 820, 830, and 840. The LENGTH in the L-SIG field of an uplink frame can be derived from the associated trigger frame. For example, the value LENGTH_2 in the L-SIG field of the uplink frames 820, 830, and 840 may be based on (e.g., derived from) the information in the associated trigger frame 810. In one example, the value LENGTH_2 of the uplink frames 820, 830, and 840 may be calculated using the DURATION indicated by the trigger frame 810. For example, the value LENGTH_2 contained in the L-SIG field of the uplink frames 820, 830, and 840 may be the DURATION indicated by the trigger frame 810 minus SIFS. In an aspect, the SIFS may represent an interval for a receiver to decode data and to transmit an acknowledgement (ACK). For example, the SIFS may be 16 microseconds. In an aspect, the DURATION indicated by the trigger frame 810 can be based on the longest UL MU PPDU. For example, in FIG. 8, the longest UL MU PPDU is the uplink frame 830. In an aspect, the other UL MU PPDUs (e.g., the uplink frames 820 and 840) may include padding in their respective payloads to extend the length of the UL MU PPDUs to the length associated with the longest uplink frame (e.g., the uplink frame 830).

In one or more aspects, LENGTH_1 may be referred to as a transmission time (TXTIME) of the trigger frame 810, and LENGTH_2 may be referred to as a TXTIME of an uplink frame 820, 830, or 840. In one or more aspects, the trigger frame 810 may include LENGTH_2. For example, the value LENGTH_2 may be included in the payload of the trigger frame 810, such as in a Media Access Control (MAC) frame of the trigger frame 810. The LENGTH in the L-SIG field of an uplink frame (e.g., 820, 830, 840) can be derived (e.g., copied) from LENGTH_2 in the payload of the trigger frame 810.

Figure 9:
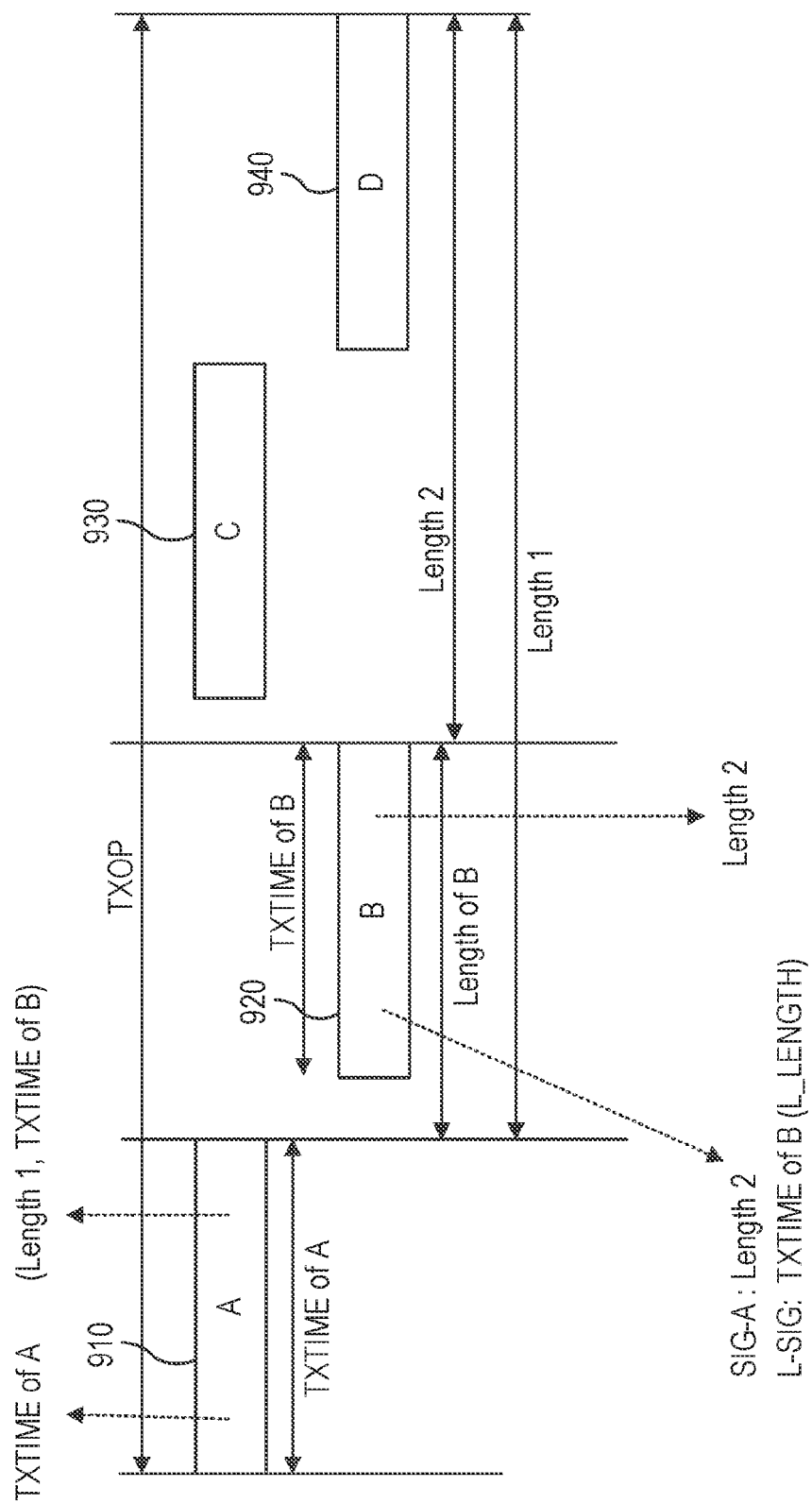

FIG. 9 illustrates a schematic diagram of an example of an exchange of frames among wireless communication devices for MU transmission. The horizontal dimension in FIG. 9 represents the time dimension. An AP sends a trigger frame 910, represented as A, to a group of participating stations. The group of participating stations may send an uplink frame to the AP in response to the trigger frame 910. In an aspect, the trigger frame 910 may be the trigger frame 710 of FIG. 7.

The trigger frame 910 may include a value associated with (e.g., indicative of) a transmission time (TXTIME) of the trigger frame 910, represented as TXTIME of A. The TXTIME of the trigger frame 910 may be the time (e.g., in microseconds) required to transmit the trigger frame 910.

A value may be, or may be based on, the TXTIME of a frame (e.g., a TXTIME of a DL or UL frame). In an aspect, a value associated with the TXTIME of a frame may be $L_{LENGTH}$, whose value is based on the TXTIME of the frame. For example, $$L_{LENGTH} = \left\lceil \frac{TXTIME - 20}{4} \right\rceil \times 3 - 3 - m, m = 1 \text{ or } 2$$

In this example, the $L_{LENGTH}$ provides a length associated with a predetermined portion of a frame. A predetermined portion may be, for example, the portion of a frame (e.g., 910 or 920) after the end of the L-SIG field of the frame. Thus, in this example, the TXTIME of a frame has a one-to-one mapping with the $L_{LENGTH}$. In an aspect, m=1 when a trigger frame (e.g., 910) is sent in an HE MU PPDU format and m=2 when a trigger frame is sent in an HE extended range SU PPDU format. In an aspect, in a legacy format (e.g., IEEE 802.11a, n, ac), m may be 0.

The value indicative of the TXTIME of the trigger frame 910 (e.g., $L_{LENGTH}$) may be contained in a preamble of the trigger frame 910. In an aspect, the value may be contained in the L-SIG field of the trigger frame 910. For example, the value may be contained as the LENGTH in the L-SIG field. In an aspect, both the TXTIME and the $L_{LENGTH}$ of the trigger frame 910 may be considered and referred to as a length of the trigger frame 910 for simplicity. Similarly, for an uplink frame (e.g., 920), the TXTIME and the $L_{LENGTH}$ of an uplink frame may be considered and referred to as a length of the uplink frame for simplicity.

In one or more aspects, the trigger frame 910 may include values indicative of a remaining TXOP duration (e.g., a TXOP duration remaining after transmission of the trigger frame 910) and TXTIME of a responding uplink frame 920, represented as Length 1 and TXTIME of B, respectively. The responding uplink frame 920, represented as B, may represent one or more uplink frames or a combined uplink frame (see, e.g., 720, 730, 740, or 750 in FIG. 7) transmitted by one or more participating stations to the AP in response to the trigger frame 910. The uplink frame 920 may also be referred to as a responding UL MU PPDU or an HE trigger-based PPDU.

The TXTIME of the uplink frame 920 may be the time (e.g., in microseconds) required by the group of stations to transmit the uplink frame 920. In an aspect, the TXTIME for each station to transmit its respective uplink frame may be the same. In this aspect, the TXTIME of the uplink frame 920 indicated by the trigger frame 910 can be based on the longest uplink frame from the group of stations, and the remaining uplink frames may include padding in their respective payloads to extend their length to the length associated with the longest uplink frame. In an aspect, the Length 1 and TXTIME of B (or their representations) may be included in a payload of the trigger frame 910. The Length 1 and TXTIME of B (or their representations) may be included in a MAC frame contained in the payload of the trigger frame 910. In an aspect, a length of an uplink frame (e.g., TXTIME of B or $L_{LENGTH}$ of the uplink frame, which is a representation of TXTIME of B) may be included in a common information (Common Info) field of the trigger frame 910.

In some aspects, the uplink frame 920 may include a value indicative of the TXTIME of the uplink frame 920, represented as TXTIME of B. For example, the value may be a length of the uplink frame 920, which may be the TXTIME of B or an $L_{LENGTH}$ based on the TXTIME of B. The value may be included in a preamble (e.g., L-SIG field) of the uplink frame 920. In some aspects, the value may be based on (e.g., derived from, copied from) the corresponding value in the trigger frame 910. The TXTIME of the uplink frame 920 may be the same as the TXTIME of the uplink frames transmitted by each of the stations, which may be combined (e.g., air-combined) to form a combined uplink frame. The payload of the uplink frame 920 may include the payload from each of the group of participating stations.

In some aspects, the uplink frame 920 may include a value (represented as Length 2 in FIG. 9) indicative of a remaining TXOP duration (e.g., a TXOP duration remaining from the end of transmission of the uplink frame 920). The value (represented as Length 2) may be based on (e.g., derived from) the content contained in the trigger frame 910. In an aspect, the stations may compute Length 2 based on Length 1 and TXTIME of B (or their representations) contained in the trigger frame 910. As an example, Length 2=Length 1−Length of B, where TXTIME of B=Length of B−SIFS. In an aspect, the value Length 2 may be contained in a preamble (e.g., HE-SIG-A field) of the uplink frame 920. For example, the value Length 2 may be contained in a TXOP Duration field of the HE-SIG-A field. In an aspect, the value Length 2 may be included in a payload of the uplink frame 920 in addition to being included in the preamble. For example, the value Length 2 may be included in a MAC frame contained in the payload of the uplink frame 920. In an aspect, the Length 1 and Length 2 may be referred to as a (i) TXOP duration indicating the remaining time in the current TXOP, (ii) a remaining TXOP duration, or (iii) a TXOP duration for simplicity. For example, the Length 1 may be a TXOP duration remaining after transmission of a trigger frame (e.g., 910) or a TXOP duration remaining from the end of transmission of a trigger frame. Similarly, the Length 2 may be a TXOP duration remaining after transmission of an uplink frame (e.g., 920) or a TXOP duration remaining from the end of transmission of an uplink frame.

As shown in FIG. 9, within the remaining TXOP duration (e.g., Length 2), a downlink frame 930 may be sent from the AP to one or more participating stations and an uplink frame 940 may be sent from one or more participating stations to the AP. In an aspect, similar to the trigger frame 910, the downlink frame 930 may include a value indicative of a TXOP duration remaining from the end of transmission of the downlink frame 930 (e.g., in the payload of the downlink frame 930) and a TXTIME (or $L_{LENGTH}$) of the uplink frame 940 (e.g., in the payload of the downlink frame 930). Similar to the uplink frame 920, the uplink frame 940 may include a value indicative of any TXOP duration remaining from the end of transmission of the uplink frame 940 (e.g., in the SIG-A field of the uplink frame 940) and a TXTIME (or $L_{LENGTH}$) of the uplink frame 940 (e.g., in the L-SIG field of the uplink frame 940). The uplink frame 940 may be a combined (e.g., air-combined) frame formed of uplink frames from multiple participating stations.

In one or more implementations, since the header of UL MU PPDUs (e.g., 720, 730, 740 of FIG. 7), which may include a legacy header and a non-legacy header, from each participating station contains identical information (e.g., to allow air-combining), the header of the UL MU PPDUs does not contain information associated with decoding of any particular UL MU PPDU. In other words, the header of each UL MU PPDU does not include station specific content for decoding its payload. In this aspect, third party stations may be unable to decode the payload of the UL MU PPDU. In a case in which only the payload contains the TXOP duration information, the third party stations may be unable to access this information since the third party stations do not have information to decode the UL MU PPDUs. Setting content associated with TXOP duration in the preamble of the downlink and/or uplink frames may facilitate access of the third party stations to the TXOP duration and allow third party stations to evaluate availability of the AP. In an aspect, evaluating the availability of the AP may facilitate reduction of interference of the third party stations with any currently ongoing transmissions.

In one or more aspects, for the SIG-A (HE-SIG-A) field in UL MU PPDUs (e.g., the uplink frames 720, 730, and 740 of FIG. 7), three approaches can be considered as follows:
  Example of a first approach: SIG-A in UL MU PPDUs is a copy of that SIG-A in the trigger frame
    Full contents can be used for SIG-A validation, but it can be too many bits for validity check
  Example of a second approach: New SIG-A format
    Some essential information which is helpful to other STAs, etc.;
    An indication bit is included in UL MU SIG-A, and it should be also included in non-UL MU SIG-A in the same bit position for a receiver to distinguish between two formats; and/or
    The indication bit differentiates between UL MU PPDU and SU PPDU.
  Example of a third approach: Reuse Compressed MAC (CMAC) in IEEE 802.11ah, which is incorporated herein in its entirety.
    Type of CMAC should be signaled by the AP (e.g., additional indication bits are needed in the trigger frame (non-UL MU preamble))
    The indication bits can be multiple bits, and similar to the second approach; those bit positions should be the same as those in the non-UL MU SIG-A In one or more implementations of the second approach, a duration to set a network allocation vector (NAV) for third party HE STAs should be included in UL MU PPDUs to protect in time-domain. In one or more aspects, the duration should be included in the SIG-A field of the UL MU PPDUs. The duration included in the SIG-A field of the UL MU PPDUs can be, or can be calculated from, a transmission opportunity (TXOP) duration of the current UL MU transmission. In an aspect, the duration is a TXOP duration (e.g., Length 2 of FIG. 9). A single transmission and ACK pair or multiple transmission pairs may exist within the TXOP duration. Within the TXOP duration, transmission(s) may occur from the AP to the participating stations, and vice versa. In an aspect, the duration included in the UL MU HE-SIG-A, represented as $DURATION_{UL\_MU}$, can be calculated as follows:

$DURATION_{UL\_MU} = DURATION_{UL\_MU\_Trigger} - LENGTH_{UL\_MU\_PPDU}$

DURATION$_{UL\_MU\_Trigger}$: Duration included in the MAC header of the trigger frame corresponding to the transmitting UL MU PPDU LENGTH$_{UL_{MU}\_PPDU}$: Length of the transmitting UL MU PPDU The DURATION$_{UL\_MU}$ may provide a remaining TXOP duration (e.g., a TXOP duration remaining from the end of transmission of the associated uplink frame). As an example, with reference to FIG. 9, the DURATION$_{UL\_MU\_Trigger}$, LENGTH$_{UL\_MU\_PPDU}$, and DURATION$_{UL\_MU}$ may be Length 1, Length of B, and Length 2, respectively. In one example, DURATION$_{UL\_MU\_Trigger}$ may be DURATION shown in FIG. 8.

In an aspect, all times (e.g., Length 1, Length 2, TXTIME of A, etc.) can be calculated in microseconds. If a calculated duration includes a fractional microsecond, the value inserted in the duration fields (e.g., Length field, TXOP duration field) may be rounded up to the next higher integer. If a calculated duration results in a negative value, the value of the Duration/ID field is 0.

In one or more implementations of the second and third approaches, stations may need to know whether a PPDU is a downlink frame or an uplink OFDMA/MU-MIMO frame. In some aspects, the frame format can be either indicated in HE-SIG-A field or determined by the modulation of the signal in an HE-SIG-A field.

In some aspects, UL MU PPDUs may utilize a different frame format and contain different content from SU PPDUs and downlink MU PPDUs. In an aspect, the uplink SU PPDUs may share the same frame format as downlink SU PPDUs. In SU PPDUs and downlink MU PPDUs, the preamble of these PPDUs may contain content utilized in decoding the payload of these PPDUs. For example, the preamble may contain content in the L-SIG field, SIG-A field, and/or SIG-B field, among other fields, to allow the decoding of the payload. In an aspect, in the case of UL MU PPDUs, the preamble of the UL MU PPDUs from each participating station in the UL MU transmission is the same (e.g., to allow air-combining). In this regard, the UL MU PPDUs may contain globally useful/common information but no station-specific content for decoding the payloads of each UL MU PPDU.

In some aspects, the frame format may be included in a Format field of the HE-SIG-A field. In an aspect, the frame format may contain content (e.g., an indication bit) that can be utilized to differentiate an SU PPDU and a trigger-based UL PPDU (e.g., UL MU PPDU). The indication bit may be referred to as a format indication or a format bit. In an aspect, the frame format may contain content that may be utilized to differentiate a UL MU PPDU from a non-UL MU PPDU. A non-UL MU PPDU may include a UL SU PPDU, DL SU PPDU, and/or DL MU PPDU. In an aspect, the HE SU PPDU (e.g., HE DL SU PPDU, HE UL SU PPDU) and the HE trigger-based UL PPDU may include the Format field.

Figure 10:
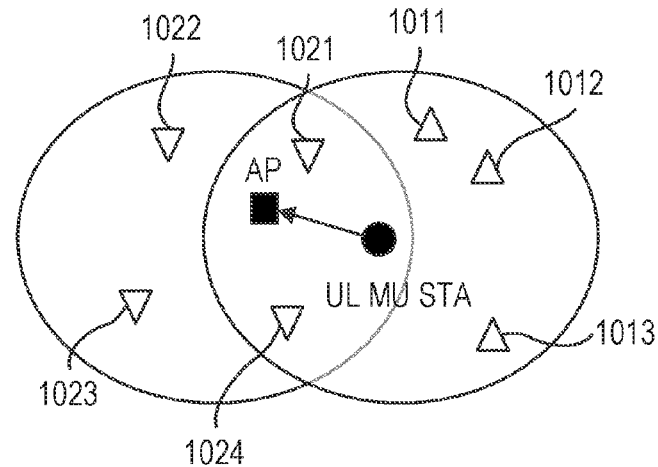
FIG. 10 illustrates an example of utilization of a duration in uplink multi-user physical layer convergence procedure (PLCP) protocol data unit (PPDU) transmissions.

FIG. 10 illustrates an example of utilization of a duration in UL MU PPDU transmissions. If a STA (represented as UL MU STA) involved in UL MU transmission sends a UL MU PPDU to the AP, and the preamble of the UL MU PPDU includes a duration in which the current UL MU transmission is maintained (e.g., TXOP duration), three third party stations (e.g., HE STAs 1011, 1012, 1013) outside of the AP's coverage can be additionally protected on top of the third party stations inside of the AP's coverage (e.g., 1021, 1022, 1023, 1024). Accordingly, NAV can be set by third party stations outside of the AP's coverage area.

In an aspect, to allow combining (e.g., air-combining) of the uplink frames (e.g., 720, 730, 740 in FIG. 7), the preambles of the uplink frames do not include station specific-content for decoding their respective payload. In this aspect, third party stations may be unable to decode the payloads of the uplink frames. Setting content associated with a TXOP duration in the preamble may facilitate access of the third party stations to the TXOP duration. In an aspect, evaluating the availability of the AP using the TXOP duration may facilitate reduction of interference of the third party stations with any currently ongoing or currently scheduled transmissions.

In one or more implementations, for the full protection of third party stations, the frequency domain may also be considered.

Figure 11:
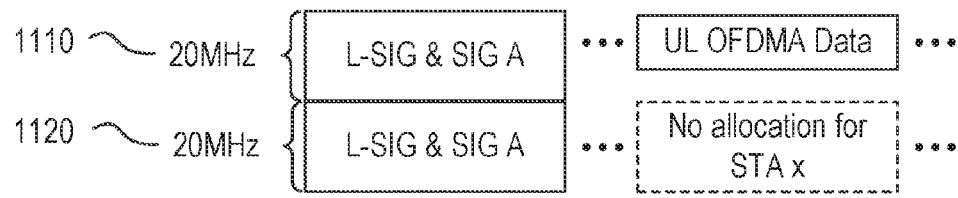
FIG. 11 illustrates an example of legacy signal (L-SIG) field and a signal-A (SIG-A) field transmission in UL MU PPDU.

FIG. 11 illustrates an example of L-SIG field and SIG-A field transmission in UL MU PPDU. In some cases, a station may transmit the L-SIG field and SIG-A field over an entire operating bandwidth (e.g., 40 MHz), even though there is no assignment (e.g., no allocation) of resources to the station in at least a portion of the operating bandwidth. In FIG. 11, the station transmits the L-SIG field and the SIG-A field in the first 20 MHz frequency sub-band (see, e.g., 1110) of the 40 MHz operating bandwidth and in the second 20 MHz frequency sub-band (e.g., 1120) of the 40 MHz operating bandwidth, even though the station is not allocated resources to transmit payload (e.g., HE-DATA) in the second 20 MHz frequency sub-band.

In some aspects, power saving may be achieved and implementation complexity may be reduced if the L-SIG field and the SIG-A field may be sent in less than the entire operating bandwidth, such as in cases where a station is not allocated resources for the entire operating bandwidth. For example, power saving may be achieved and implementation complexity may be reduced since the station avoids having to change transmission bandwidth during a transmission of a UL MU PPDU. In an aspect, UL MU TXOP is not fully protected in the frequency domain when the L-SIG field and the SIG-A field are not sent over the entire operating bandwidth.

Figure 12:
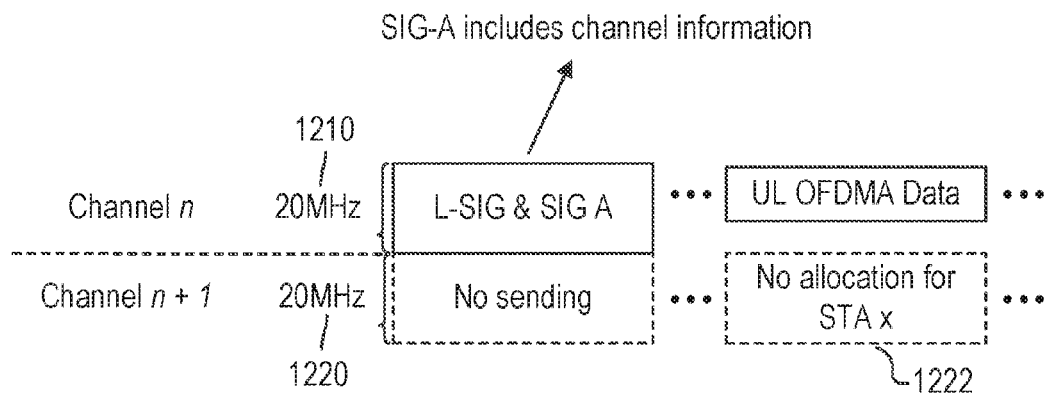
FIG. 12 illustrates an example of an absolute frequency allocation information included in a SIG-A field of a UL MU PPDU.

FIG. 12 illustrates an example of an absolute frequency allocation information included in a SIG-A field of a UL MU PPDU. In an aspect, the channel (frequency) information may be an absolute value or a distinguishable index because a third party station that receives a single 20 MHz SIG-A can recognize the whole operating bandwidth for the current UL MU transmission. In an aspect, with not sending L-SIG field and the SIG-A in frequency bands (e.g., 1220) in which there is no UL MU data allocation (e.g., 1222), the operating bandwidth information (e.g., absolute channel information) carried in SIG-A may facilitate protection from third party stations. In an aspect, the minimum granularity can be 20 MHz.

In the example shown in FIG. 12, the station transmits the L-SIG field and the SIG-A field in the first 20 MHz frequency sub-band (see, e.g., 1210) of the 40 MHz operating bandwidth where the station is allocated resources to transmit a payload (e.g., HE-DATA). The station, however, does not transmit the L-SIG field and the SIG-A field in the second 20 MHz frequency sub-band (e.g., 1220) of the 40 MHz operating bandwidth, where the station is not allocated resources to transmit a payload (e.g., HE-DATA).

The SIG-A in the UL MU PPDU may include multiple channel indices (e.g., n and n+1) or a set of starting channel index (e.g., n) and bandwidth when continuous bandwidth is assumed. If non-contiguous bandwidth allocation is assumed (e.g., 80 MHz+80 MHz), an absolute value or a distinguishable index may be used, or multiple sets of starting channel indices and bandwidth may be used. The absolute frequency information can be beneficial to stations in overlapping basic service set (OBSS) even in the case shown in FIG. 11.

As another example, the L-SIG and SIG-A fields in a primary channel may always be transmitted even if there is no UL OFDMA data in the primary channel, and L-SIG and SIG-A is transmitted in secondary channels where UL OFDMA data is allocated. In this case, the absolute frequency allocation information in SIG-A of UL MU PPDU may be useful.

In one or more implementations, the L-SIG and SIG-A fields, among other fields in the preamble, are sent only in frequency bands within which UL OFDMA data is allocated. In an aspect, a minimum granularity for sending the L-SIG and SIG-A fields, among other fields in the preamble, may be 20 MHz frequency bands. The UL OFDMA data may be carried over less than an entirety of the frequency bands. In an aspect, the absolute channel information is not included in the preamble.

Based on the frequency allocation information and the assumption that the number of SIG-A symbols in a UL MU PPDU is 2, the SIG-A field may have the following design. The number of bits for each field of the SIG-A field is by way of non-limiting example. In this example, the number of total bits is 48 bits, which may exactly fit into 2 symbols of SIG-A in 64 FFT transmission.

CRC (8 bits), Tail (6 bits)
UL MU Indication (1 bit)
    Differentiate between UM MU (trigger-based UL MU) transmission and SU transmission (downlink and uplink)
    This indication should be located in the same bit position of that in non-UL MU SIG-A (e.g., downlink and uplink SU SIG-A)
Duration (16 bits)
    TXOP duration for time-protection, informed by the triggering AP
    Unit of microsecond, and can be reduced depending on the available bits
Partial basic service set identifier (BSSID) of the triggering AP (9 bits)
    Partial BSSID of the triggering AP is also necessary to distinguish with other UL MU transmission.
Channel number, $n_{ch,20}$ of 20 MHz bandwidth as a channel index of starting 20 MHz from the lowest frequency (6 bits)
    Because SIG-A is duplicated in every 20 MHz, a third party station reading a SIG-A in 20 MHz cannot figure out the whole operating bandwidth
    In the unit of 20 MHz, $n_{ch,20}=1, \ldots, 50$ can be enough to indicate the exact position
        Lowest 20 MHz channel frequency=channel starting frequency+$20 \times n_{ch,20}$ (MHz)
            Note that in VHT specification, Channel center frequency=Channel starting frequency+$5 \times n_{ch}$ (MHz), where $n_{ch}=1, \ldots 200$, and it means 200 indices can express the whole channels of 5 MHz unit. Therefore, 50 indices are enough to indicate the whole bandwidth in the unit of 20 MHz
Bandwidth (2 bits)
In an aspect, the BSSID field may be referred to as a Color field.

As another example, the SIG-A field may have the following design.

CRC (4 bits), Tail (6 bits)
UL MU Indication (1 bit)
Duration (7 bits)
Partial basic service set identifier (BSSID) of the triggering AP (6 bits)
Bandwidth (2 bits)

The SIG-A field provided above are by way of non-limiting example. The SIG-A field may be of a different size. In an aspect, for instance, the SIG-A field may be 52 bits.

In the third approach (e.g., reuse CMAC in IEEE 802.11ah), an indication is also included in UL MU SIG-A and non-UL MU SIG-A in the same position. In an aspect, multiple bits may be used if multiple IEEE 802.11ah CMAC frames are considered for UL MU PPDU. In an aspect, UL MU SIG-A may refer to the SIG-A field of a UL MU PPDU. In an aspect, non-UL MU SIG-A may refer to the SIG-A field of a non-UL MU PPDU.

In IEEE 802.11ah, there are two types of field formats depending on the bandwidth. Each field format has nine types of CMAC frames (3 bits for the types).

8 control frames: null data packet (NDP) clear to send (CTS), NDP contention-free end (CF-End), NDP power save-poll (PS-Poll), NDP acknowledgement (Ack), NDP power save-poll acknowledgement (PS-Poll-Ack), NDP block acknowledgement (BlockAck), NDP Beamforming Report Poll, NDP Paging
    1 management frame: NDP Probe Request In order to allow reuse of existing CMAC frame, the following should be considered:

Some CMAC frames cannot be used if they include station specific information (e.g., preferred modulation and coding scheme (MCS) in NDP PS-Poll)
    2 MHz NDP CMAC cannot be used in some frame types because CRC is 4 bits in IEEE 802.11ah but 8 bits in IEEE 802.11ax In an aspect, each type of CMAC frame has two types depending on sub-1 GHz (SIG) NDP frame format, except for the NDP Beamforming Report Poll which has only 2 MHz frame. The SIG NDP frame format may include an NDP_1M for a 1 MHz frame format and NDP_2M for a 2 MHz frame format. Each type of CMAC may include a Duration field and a RA/TA/Partial BSSID field. These fields are common to all nine types of CMAC frames and may be referred to as common component fields. For NDP_1M, the Duration field may be 10 bits referring to units of OFDM symbol duration (40 μs). For NDP_2M, the Duration field may be 15 bits referring to units of microseconds in most cases. In an NDP_2M Ack, the Duration field may be 14 bits. The Partial BSSID field, which contains a partial AID or partial BSSID, may be 9 bits. In some aspects, one of the nine CMAC frames may be used as the pre-defined UL MU preamble format. In some aspects, compared to the second approach, duration and RA is still included, but no channel number is included.

Figure 13:
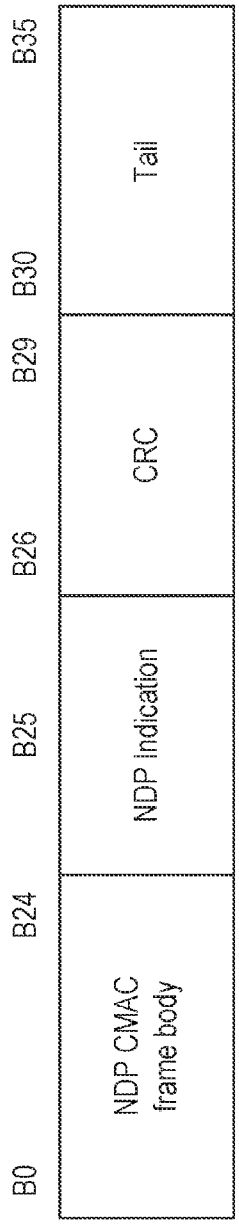
FIG. 13 illustrates an example of a SIG field format for a 1 MHz null data packet (NDP) compressed media access control (CMAC) frame.
Figure 14:
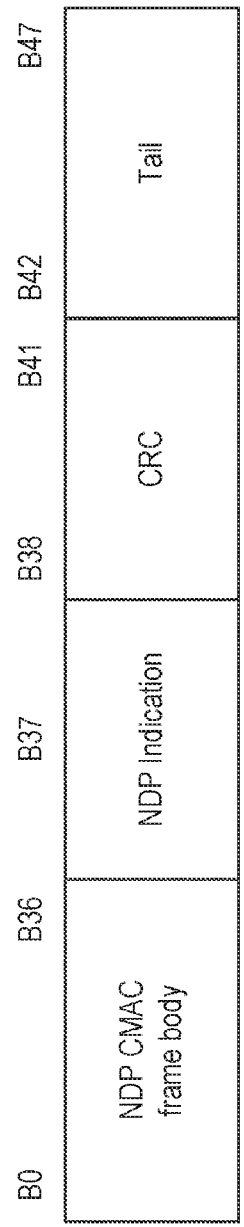
FIG. 14 illustrates an example of a SIG field format for a greater than or equal to 2 MHz NDP CMAC frame.

FIG. 13 illustrates an example of a SIG field format for a 1 MHz null data packet (NDP) CMAC frame. FIG. 14 illustrates an example of a SIG field format for a greater than or equal to 2 MHz NDP CMAC frame.

FIG. 15 illustrates an example of an NDP CTS frame. In an aspect, the NDP CTS frame may be an NDP_2M CTS frame. FIG. 16 illustrates an example of an NDP CF-End frame. In an aspect, the NDP CF-End frame may be an NDP_2M CF-End frame. The NDP CTS frame and NDP CF-End frame may include a CTS/CF-End Indicator field that indicates whether the frame is a CTS or CF-End frame. The CTS/CF-End Indicator field may be 1 bit (e.g., binary). The Address Indicator field may be 1 bit. For example, the Address Indicator field may be set to 0 to indicate that the RA/Partial BSSID field contains the partial identifier of the receiving station. The Address Indicator field may be set to 1 to indicate that the RA/Partial BSSID field contains the partial BSSID of the AP transmitting the frame and is interpreted as a broadcast address. The Early Sector Indicator field may be utilized to indicate if the NDP CTS frame is followed by the sectorized beam frame exchange. The Early Sector Indicator field may be 1 bit.

In an aspect, the NDP CTS frame format may be used without the four reserved bits. The first 33 bits may be utilized, followed by 1 bit for a UL MU indication (e.g., for third party stations) and 14 bits for a CRC/Tail. The modified NDP CTS frame format may be 48 bits.

FIG. 17 illustrates an example of an NDP PS-Poll frame. In an aspect, the NDP PS-Poll frame may be an NDP_2M PS-Poll frame. The Preferred MCS field may be 3 bits for NDP_1M (e.g., 0~6, MSC index, 7: no preference) and 5 bits for NDP_2m (e.g., 0~9: MSC index, 10: no preference, 11~15: reserved). The Uplink Data Indicator (UDI) field may be 1 bit for NDP_1M or 12 bits for NDP_2M. For NDP_1M, the 1 bit may be utilized to indicate if the station has uplink data to transmit. For NDP_2M, the 12 bits may be utilized to indicate if the station has uplink data to transmit and may be utilized by a subchannel selective transmission (SST) station to indicate its SST channel. For example, the UDI field may be set to 0 to indicate there is no uplink data to be sent: set to 1 to indicate there is uplink data to be sent; set between 2 and 9 to indicate relative position of the selected SST channel; and set to 10 or greater to indicate the estimated time, in units of 40 μs, required for uplink data frames that are present at the station, excluding the duration of their response and applicable IFS durations.

Figure 19:
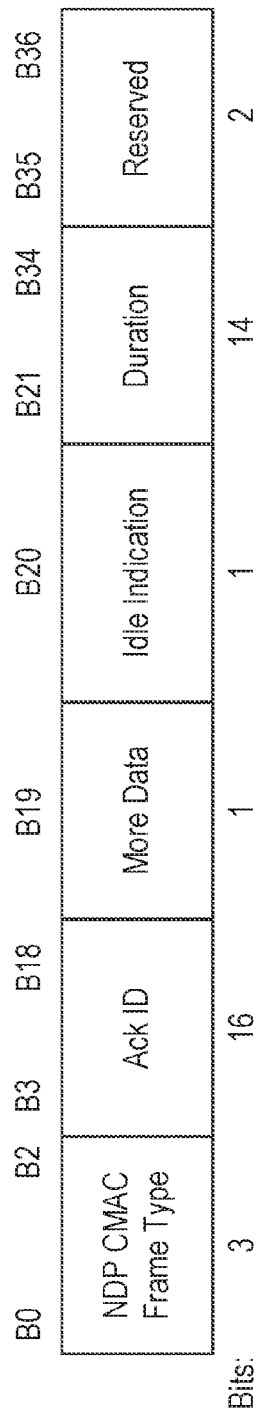
FIG. 19 illustrates an example of an NDP power save-poll acknowledgement (PS-Poll-Ack) frame.

FIG. 18 illustrates an example of an NDP Ack frame. In an aspect, the NDP Ack frame may be an NDP_2M Ack frame. FIG. 19 illustrates an example of an NDP PS-Poll-Ack frame. In an aspect, the NDP PS-Poll-Ack frame may be an NDP_2M PS-Poll-Ack frame. The Ack ID field may be 9 bits or 16 bits. The Ack ID field may be set to the bit sequence CRC[0:3]||TA[4:8] or CRC[0:3]||TA[0:8]||RA[6:8] obtained from the CRC, TA, and RA field of the NDP PS-Poll frame that elicited the response. The Idle Indication field may be 1 bit, and may be set to 1 if the Duration field indicates an idle period. The Relayed Frame field and the More Data field may each be 1 bit.

Figure 20:
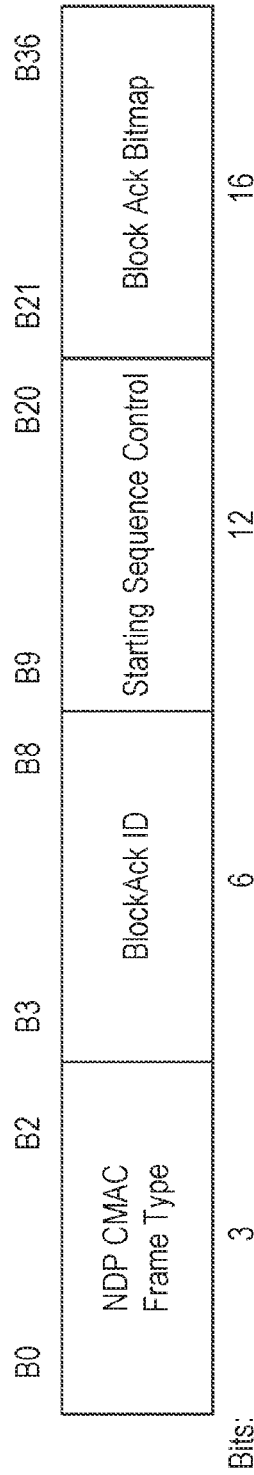
FIG. 20 illustrates an example of an NDP block acknowledgement (BlockAck) frame.

FIG. 20 illustrates an example of an NDP BlockAck frame. In an aspect, the NDP BlockAck frame may be an NDP_2M BlockAck frame. The BlockAck ID field may be 2 bits or 6 bits. The BlockAck ID field may contain the 2 or 6 LSBs of the bit sequence of the scrambler initialization value in the SERVICE field prior to the descrambling of the PSDU that carries the soliciting frame. The Starting Sequence Control field may be 12 bits, and may contain the sequence number of the first MSDU or A-MSDU for which the NDP BlockAck frame is sent. The Block Ack Bitmap field may be 8 or 16 bits. The Block Ack Bitmap field may indicate the received status of up to 8 or 16 MSDUs and A-MSDUs when the NDP BlockAck is used during a BlockAck session. Each bit that is set equal to 1 in the NDP BlockAck bitmap acknowledges the successful reception of a single MSDU or A-MSDU, in the order of sequence number. The Block Ack Bitmap field may indicate the received status of up to 8 or 16 fragments of an MSDU when the NDP BlockAck is used during a fragment BA session. Each bit that is set equal to 1 in the BlockAck bitmap acknowledges the successful reception of a single fragment of an MSDU, in the order of the fragment number.

Figure 21:
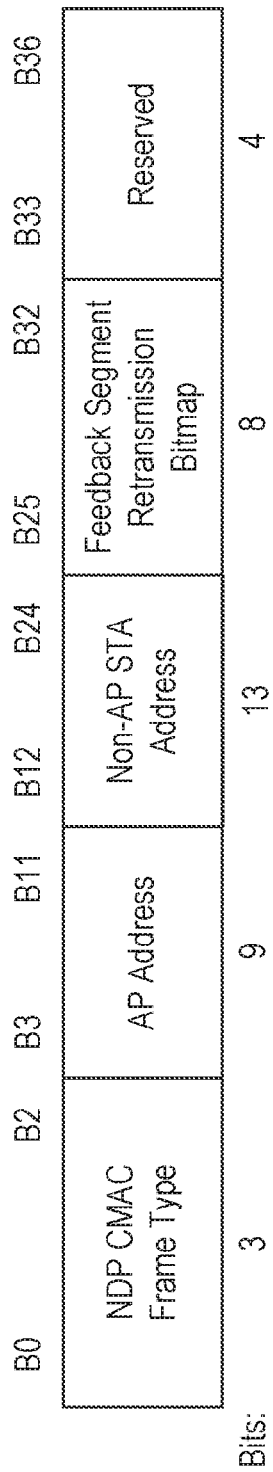
FIG. 21 illustrates an example of an NDP Beamforming Report Poll frame.

FIG. 21 illustrates an example of an NDP Beamforming Report Poll frame. In an aspect, the NDP Beamforming Report Poll frame may be an NDP_2M Beamforming Report Poll frame. The Feedback Segment Retransmission Bitmap field may indicate the feedback segments to be polled in a Compressed Beamforming report (e.g., VHT or HE compressed beamforming report), which may be contained in one or more compressed beamforming frames (e.g., VHT or HE compressed beamforming frames). In an aspect, the Beamforming Report Poll frame is not utilized in NDP_1M.

Figure 22:
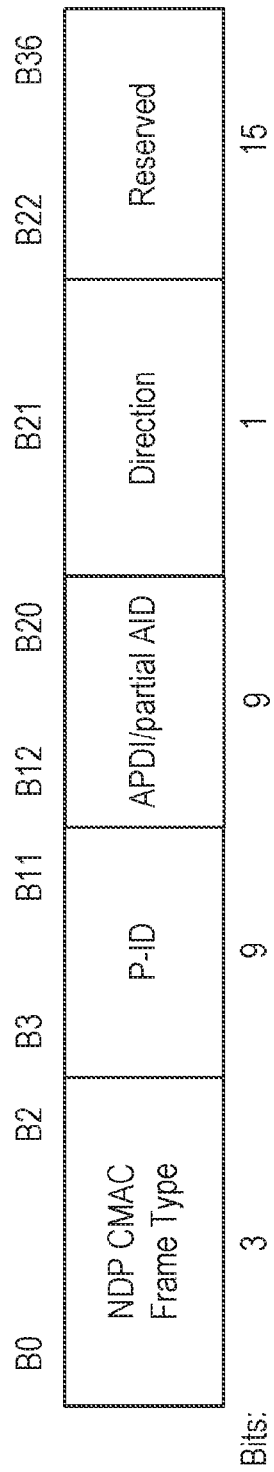
FIG. 22 illustrates an example of an NDP Paging frame.

FIG. 22 illustrates an example of an NDP Paging frame. In an aspect, the NDP Paging frame may be an NDP_2M Paging frame. The P-ID field may include 9 bits and may be an identifier of the NDP paging requester. The Direction field may be 1 bit. If the Direction field is 1, the APDI/Partial AID field indicates AP direction information (APDI). If the Direction field is 0, the APDI/Partial AID field indicates the partial AID of the NDP paging responder station. The APDI field may be 9 bits. The 8 MSBs of the APDI, depending on the value of the Action subfield of the NDP Paging Response, contain:

- The PTSF subfield if the Action subfield is not equal to 4. The PTSF subfield is set to the value of the partial TSF of the transmitting station as defined in Section 10.44.6 (NDP Paging Setup) of IEEE 802.11ah draft v6.0.
- The ASD subfield if the Action subfield is equal to 4. The ASD subfield is the additional sleep duration and is set to the time, in units of SIFS, after which the receiver station is in Awake state as described in Section 10.44.6 (NDP Paging Setup) of IEEE 802.11ah.

The LSB of the APDI is the Check Beacon Flag subfield and is an indicator of critical changes in the Beacon frame as described in Section 10.44.6 (NDP Paging Setup) of IEEE 802.11ah.

Figure 23:
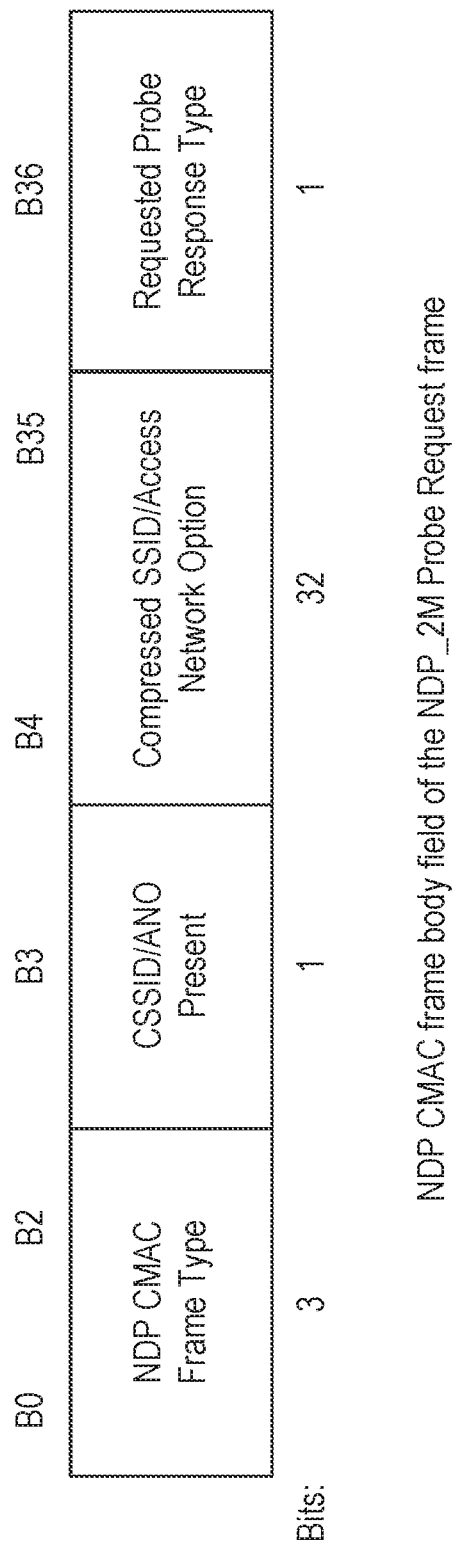
FIG. 23 illustrates an example of an NDP Probe Request frame.

FIG. 23 illustrates an example of an NDP Probe Request frame. In an aspect, the NDP Probe Request frame may be an NDP_2M Probe Request frame. The CSSID/ANO Present field may be 1 bit. The CSSID/ANO Present field may indicate if the NDP Probe Request frame contains a Compressed SSID field or an Access Network Option field. The CSSID/ANO Present field may be set to 0 if the NDP Probe Request contains the Compressed SSID, and may be set to 1 if the NDP Probe Request contains the Access Network Option. The Compressed SSID/ANO Option may be 16 or 32 bits. The Compressed SSID/Access Network Option [0:31] may be set to Compressed SSID, which may be a 32-bit CRC calculated as defined in Section 9.2.4.8 (FCS field) of IEEE 802.11ah draft v6.0, wherein the calculated fields is the full SSID. The Compressed SSID/Access Network Option [0:7] may be set to Access Network Option, which is defined in Section 9.4.2.92 (Interworking element) of IEEE 802.11ah (see FIG. 9-436(Access Network Options field format)). Compressed SSID/Access Network Option [8:31] may be reserved. The Requested Probe Request Response Type field may be 1 bit. The Requested Probe Request Response Type field may be set to 0 if the station requests a Short Probe Response frame, and may be set to 1 if the station requests a Probe Response frame.

In FIGS. 13 through 23, the bits associated with each field of the frame is provided. For example, in FIG. 16, the NDP CMAC Frame Type field is contained in bits B0 through B2 of the NDP CF-End frame. In other words, the NDP CMAC Frame Type field forms the first 3 bits of the NDP CF-End frame.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

Figure 24A:
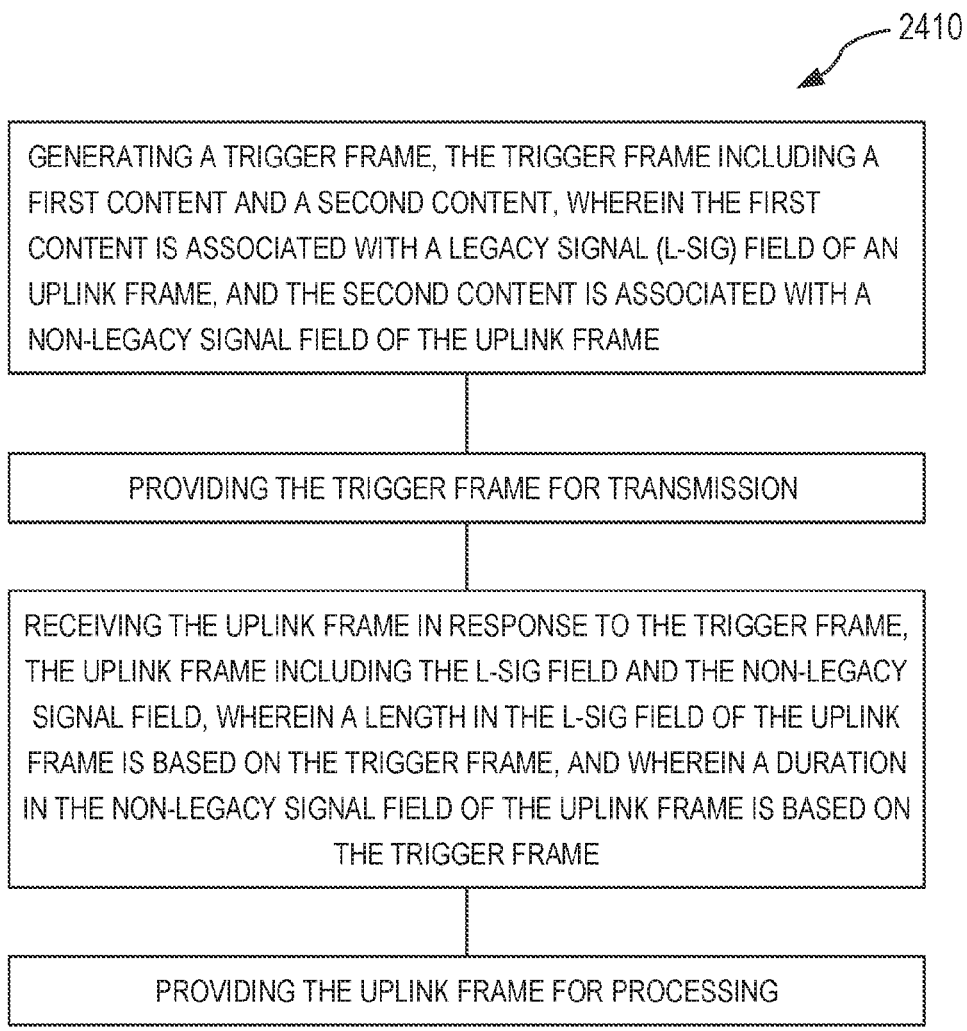
FIGS. 24A, 24B, and 24C illustrate flow charts of examples of methods for facilitating wireless communication for multi-user transmission.
Figure 24B:
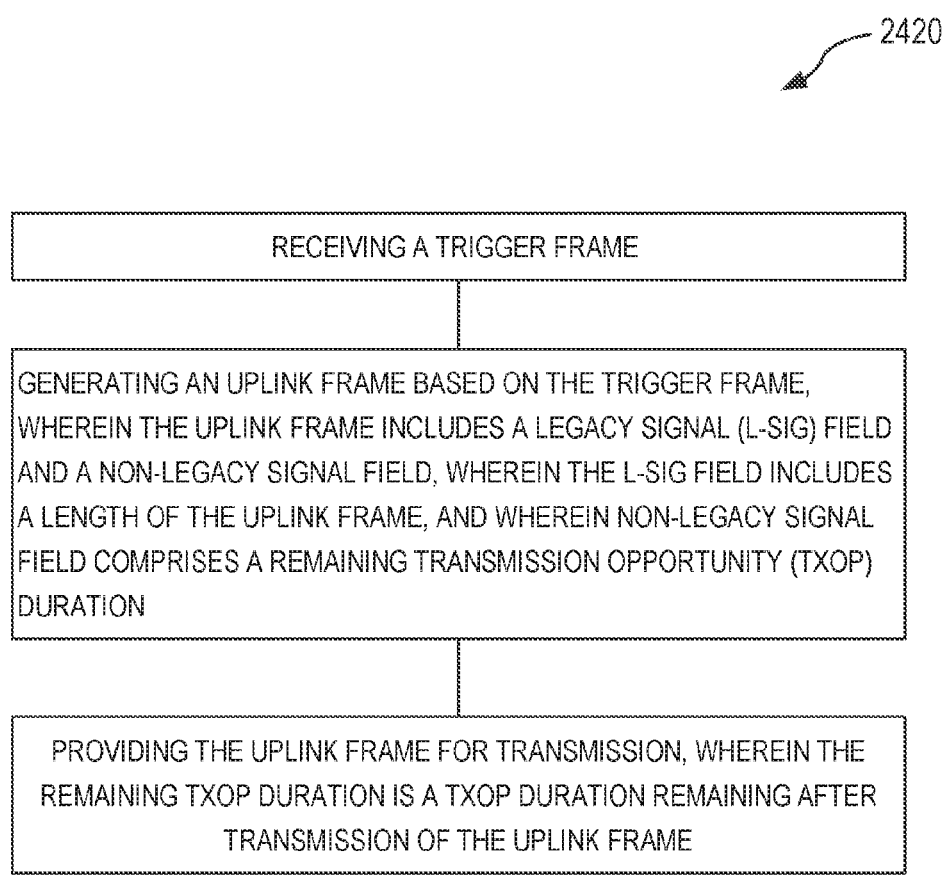
Figure 24C:
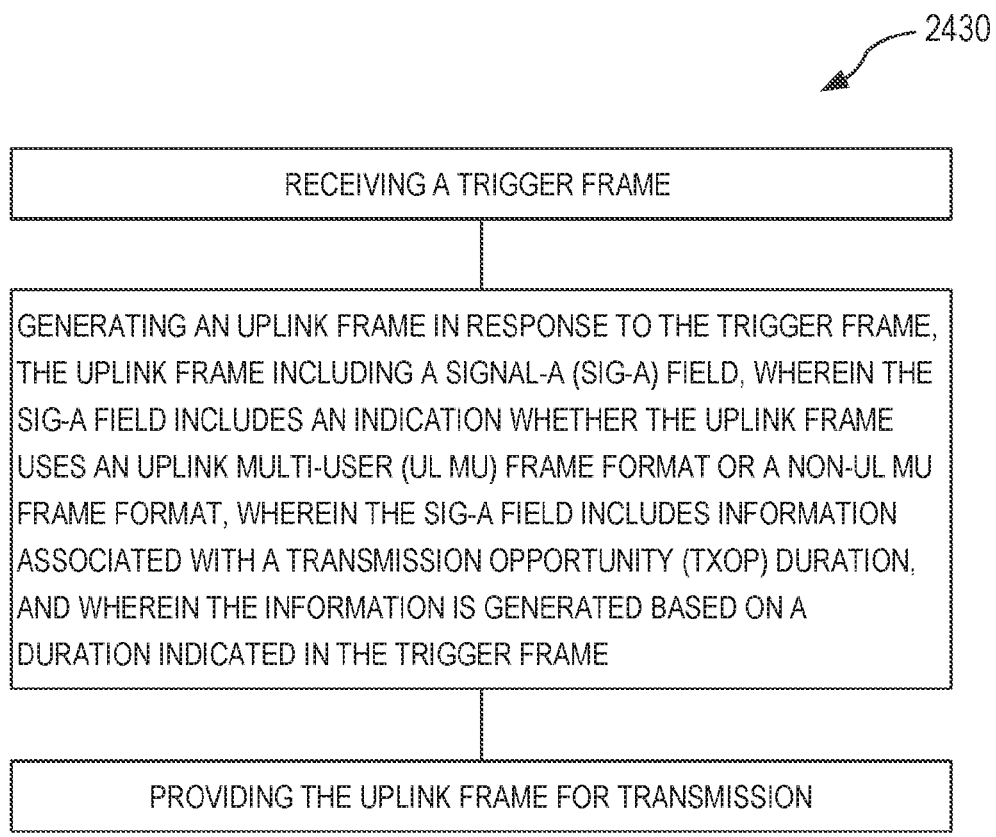

FIGS. 24A, 24B, and 24C illustrate flow charts of examples of methods for facilitating wireless communication. For explanatory and illustration purposes, the example processes 2410, 2420 and 2430 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 2410, 2420 and 2430 are not limited to the wireless communication devices 111-115 of FIG. 1 or their components, and the example processes 2410, 2420 and 2430 may be performed by some of the devices shown in FIG. 1, or other devices or components. Further for explanatory and illustration purposes, the blocks of the example processes 2410, 2420 and 2430 are described herein as occurring in serial or linearly. However, multiple blocks of the example processes 2410, 2420 and 2430 may occur in parallel. In addition, the blocks of the example processes 2410, 2420 and 2430 need not be performed in the order shown and/or one or more of the blocks/actions of the example processes 2410, 2420 and 2430 need not be performed.

Various examples of aspects of the disclosure are described below as clauses for convenience. These are provided as examples, and do not limit the subject technology. As an example, some of the clauses described below are illustrated in FIGS. 24A, 24B and 24C.

Clause A. An access point for facilitating multi-user communication in a wireless network, the station comprising: one or more memories; and one or more processors coupled to the one or more memories, the one or more processors configured to cause: generating a trigger frame, the trigger frame comprising a first content and a second content, wherein the first content is associated with a legacy signal (L-SIG) field of an uplink frame, and the second content is associated with a non-legacy signal field of the uplink frame, providing the trigger frame for transmission; receiving the uplink frame in response to the trigger frame, the uplink frame comprising the L-SIG field and the non-legacy signal field, wherein a length in the L-SIG field of the uplink frame is based on the trigger frame, and wherein a duration in the non-legacy signal field of the uplink frame is based on the trigger frame; and providing the uplink frame for processing.

Clause B. A station for facilitating multi-user communication in a wireless network, the station comprising: one or more memories; and one or more processors coupled to the one or more memories, the one or more processors configured to cause: receiving a trigger frame; generating an uplink frame based on the trigger frame, wherein the uplink frame comprises a legacy signal (L-SIG) field and a non-legacy signal field, wherein the L-SIG field comprises a length of the uplink frame, and wherein the non-legacy signal field comprises a remaining transmission opportunity (TXOP) duration; and providing the uplink frame for transmission, wherein the remaining TXOP duration is a TXOP duration remaining after transmission of the uplink frame.

Clause C. A computer-implemented method of facilitating multi-user communication in a wireless network, the method comprising: receiving a trigger frame; generating an uplink frame in response to the trigger frame, the uplink frame comprising a signal-A (SIG-A) field, wherein the SIG-A field comprises an indication whether the uplink frame uses an uplink multi-user (UL MU) frame format or a non-UL MU frame format, wherein the SIG-A field comprises information associated with a transmission opportunity (TXOP) duration, and wherein the information is generated based on a duration indicated in the trigger frame; and providing the uplink frame for transmission.

In one or more aspects, additional clauses are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An access point for facilitating multi-user communication in a wireless network, the access point comprising:
   one or more memories; and
   one or more processors coupled to the one or more memories, the one or more processors configured to cause:
      generating a trigger frame, the trigger frame comprising a first content and a second content, wherein the first content is associated with a legacy signal (L-SIG) field of an uplink frame, and the second content is associated with a high efficiency signal-A (HE-SIG-A) field of the uplink frame;
      providing the trigger frame for transmission;
      receiving the uplink frame in response to the trigger frame, the uplink frame comprising the L-SIG field and the HE-SIG-A field, wherein a length in the L-SIG field of the uplink frame is based on the trigger frame, and wherein a duration in the HE-SIG-A field of the uplink frame is based on the trigger frame; and
      providing the uplink frame for processing,
   wherein the second content is a first transmission opportunity (TXOP) duration remaining after transmission of the trigger frame,
   wherein the duration is a second TXOP duration remaining after transmission of the uplink frame, and
   wherein the second TXOP duration is derived from the first TXOP duration.

2. The access point of claim 1, wherein the length is based on the first content, and the duration is based on the second content.

3. The access point of claim 1, wherein the length of L-SIG field is based on a longest uplink frame among uplink frames to be received simultaneously with the uplink frame.

4. The access point of claim 1, wherein the HE-SIG-A field of the uplink frame comprises an indication whether the uplink frame is in a trigger-based uplink (UL) frame format.

5. The access point of claim 1, wherein the HE-SIG-A field of the uplink frame comprises a format indication bit to differentiate between a single user (SU) frame and an uplink multi-user (UL MU) frame, wherein the trigger frame is to initiate UL MU frame transmission.

6. The access point of claim 1, wherein the duration is to set a network allocation vector (NAV) by a station, wherein the station is not a destination of the uplink frame.

7. The access point of claim 1, wherein the first content comprises the length in the L-SIG field of the uplink frame.

8. The access point of claim 1, wherein the first content and the second content are located within a payload of the trigger frame.

9. A station for facilitating multi-user communication in a wireless network, the station comprising:
 one or more memories; and
 one or more processors coupled to the one or more memories, the one or more processors configured to cause:
  receiving a trigger frame;
  generating an uplink frame based on the trigger frame, wherein the uplink frame comprises a legacy signal (L-SIG) field and a non-legacy signal field, wherein the L-SIG field comprises a length of the uplink frame, and wherein the non-legacy signal field comprises a first transmission opportunity (TXOP) duration; and
  providing the uplink frame for transmission,
 wherein the first TXOP duration is a TXOP duration remaining after transmission of the uplink frame,
 wherein the first TXOP duration is derived from a second TXOP duration after transmission of the trigger frame, and
 wherein the second TXOP duration is indicated in the trigger frame.

10. The station of claim 9, wherein the non-legacy signal field comprises a format indication bit to differentiate between a single user (SU) frame and an uplink multi-user (UL MU) frame, wherein the trigger frame is for initiating UL MU frame transmission.

11. The station of claim 9, wherein the non-legacy signal field further comprises an indication whether the uplink frame is in a trigger-based uplink (UL) frame format.

12. The station of claim 9, wherein the length is based on a content in the trigger frame.

13. The station of claim 9, wherein providing the uplink frame for transmission comprises providing the L-SIG field and the non-legacy signal field for transmission only in one or more frequency bands occupied by a payload of the uplink frame, wherein the minimum granularity associated with each of the one or more frequency bands is 20 MHz.

14. The station of claim 9, wherein the non-legacy signal field is a high efficiency signal-A (HE-SIG-A) field.

15. The station of claim 9, wherein the first TXOP duration is for setting a network allocation vector (NAV) by another station, wherein the another station is not a destination of the uplink frame.

16. A computer-implemented method of facilitating multi-user communication in a wireless network, the method comprising:
 receiving a trigger frame;
 generating an uplink frame in response to the trigger frame, the uplink frame comprising a signal-A (SIG-A) field, wherein the SIG-A field comprises an indication whether the uplink frame uses an uplink multi-user (UL MU) frame format or a non-UL MU frame format, wherein the SIG-A field comprises information associated with a first transmission opportunity (TXOP) duration; and
 providing the uplink frame for transmission,
 wherein the first TXOP duration is a TXOP duration remaining after transmission of the uplink frame,
 wherein the first TXOP duration is derived from a second TXOP duration remaining after transmission of the trigger frame, and
 wherein the second TXOP duration is indicated in the trigger frame.

\* \* \* \* \*